United States Patent
Fan et al.

(10) Patent No.: US 12,513,621 B2
(45) Date of Patent: Dec. 30, 2025

(54) ANTENNA PANEL MANAGEMENT METHOD, APPARATUS, AND SYSTEM

(71) Applicant: HUAWEI TECHNOLOGIES CO., LTD., Shenzhen (CN)

(72) Inventors: Bo Fan, Chengdu (CN); Xi Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 402 days.

(21) Appl. No.: 18/166,047

(22) Filed: Feb. 8, 2023

(65) Prior Publication Data

US 2023/0189157 A1   Jun. 15, 2023

Related U.S. Application Data

(63) Continuation of application No. PCT/CN2020/109020, filed on Aug. 13, 2020.

(51) Int. Cl.
  *G08C 17/00* (2006.01)
  *H01Q 3/24* (2006.01)
  *H04W 52/02* (2009.01)
  *H04W 72/20* (2023.01)

(52) U.S. Cl.
  CPC .......... *H04W 52/0283* (2013.01); *H01Q 3/24* (2013.01); *H04W 72/20* (2023.01)

(58) Field of Classification Search
  CPC ............. H04W 52/0283; H04W 72/20; H04W 52/028; H04W 52/02; H04W 52/0216; H04W 84/12; H04W 52/0229; H04W 84/18; H01Q 3/24; H04B 7/063; H04B 7/0691; H04B 7/06956; Y02D 30/70
  See application file for complete search history.

(56) References Cited

U.S. PATENT DOCUMENTS

| | | | |
|---|---|---|---|
| 12,193,023 B2* | 1/2025 | Zhang | H04W 72/23 |
| 2020/0029274 A1 | 1/2020 | Cheng et al. | |
| 2022/0007293 A1* | 1/2022 | Kaikkonen | H04W 36/324 |

(Continued)

FOREIGN PATENT DOCUMENTS

| | | |
|---|---|---|
| CN | 110012556 A | 7/2019 |
| CN | 110537334 A | 12/2019 |
| CN | 110537388 A | 12/2019 |

(Continued)

OTHER PUBLICATIONS

ZTE., "Enhancements on multi-beam operation", 3GPP TSG RAN WG1 Meeting #95, R1-1812257, Spokane, USA, Nov. 12-16, 2018, 11 pages.

(Continued)

*Primary Examiner* — Phuongchau Ba Nguyen
(74) *Attorney, Agent, or Firm* — Maier & Maier, PLLC

(57) ABSTRACT

An antenna panel management method, an apparatus, and a system, implement management of a plurality of antenna panels, and reduce power consumption of a terminal device. In this solution, a terminal device switches a state of a first antenna panel from a first state to a second state. The terminal device includes a plurality of antenna panels. The plurality of antenna panels may support one or more of an activated state, a semi-activated state, or a deactivated state, and the first antenna panel is one or more of the plurality of antenna panels.

20 Claims, 9 Drawing Sheets

(56) References Cited

U.S. PATENT DOCUMENTS

2022/0123818 A1\* 4/2022 Li .................. H04B 7/0695
2022/0361019 A1\* 11/2022 Laselva ............ H04B 7/0834

FOREIGN PATENT DOCUMENTS

| CN | 110868231 A | 3/2020 |
|---|---|---|
| CN | 111278089 A | 6/2020 |
| WO | 2020067806 A1 | 4/2020 |

OTHER PUBLICATIONS

Nokia et al., "Beam indication", 3GPP TSG-RAN WG1#90, R1-1714248, Prague, Czech Republic, Aug. 21-25, 2017, 6 pages.
Intel Corporation, "Triggering UE adaptation to power consumption characteristics", 3GPP TSG RAN WG1 Meeting #95, Spokane, USA Nov. 12-16, 2018, R1-1812514, 5 pages.
"3rd Generation Partnership Project; Technical Specification Group Radio Access Network; NR; Radio Resource Control (RRC) protocol specification (Release 15)", 3GPP TS 38.331 V15.3.0 (Sep. 2018), 445 pages.
"3rd Generation Partnership Project; Technical Specification Group Radio Access Network; NR; Physical channels and modulation (Release 15)", 3GPP TS 38.211 V15.0.0 (Dec. 2017), 73 pages.
"3rd Generation Partnership Project; Technical Specification Group Radio Access Network; NR; Multiplexing and channel coding (Release 15)", 3GPP TS 38.212 V15.0.0 (Dec. 2017), 82 pages.
"3rd Generation Partnership Project; Technical Specification Group Radio Access Network; NR; Physical layer procedures for data (Release 15)", 3GPP TS 38.214 V15.0.0 (Dec. 2017), 71 pages.
"3rd Generation Partnership Project; Technical Specification Group Radio Access Network; NR; Physical layer procedures for control (Release 15)", 3GPP TS 38.213 V15.0.0 (Dec. 2017), 56 pages.

\* cited by examiner

ANTENNA PANEL MANAGEMENT METHOD, APPARATUS, AND SYSTEM

CROSS-REFERENCE TO RELATED APPLICATIONS

This application is a continuation of International Application No. PCT/CN2020/109020, filed on Aug. 13, 2020, the disclosure of which is hereby incorporated by reference in its entirety.

TECHNICAL FIELD

The embodiments relate to the communication field, an antenna panel management method, an apparatus, and a system.

BACKGROUND

A main problem of high-frequency communication is that the signal energy drops sharply with the transmission distance, resulting in a short signal transmission distance. To overcome this problem, an analog beam technology is used in high-frequency communication to concentrate signal energy in a relatively small angle range, to form a signal (referred to as an analog beam) similar to a light beam, thereby increasing a transmission distance.

Generally, one or more antenna panels may be configured for a terminal device that performs communication by using the analog beam technology. Each antenna panel may include a plurality of antennas. These antennas are arranged into an antenna array to perform beamforming. After beams are formed, data is sent and received by using these beams.

When the terminal device is configured with a plurality of antenna panels, management of the plurality of antenna panels is inevitable when the terminal device performs communication by using an analog beam. Therefore, it may be necessary to manage the plurality of antenna panels.

SUMMARY

The embodiments provide an antenna panel management method, an apparatus, and a system, implementing management of a plurality of antenna panels.

To achieve the foregoing objectives, the following solutions are used in the embodiments.

According to a first aspect, an antenna panel management method is provided. In this solution, a terminal device switches a state of a first antenna panel from a first state to a second state. The terminal device includes a plurality of antenna panels. The plurality of antenna panels may support one or more of an activated state, a semi-activated state, or a deactivated state, and the first antenna panel is one or more of the plurality of antenna panels. An antenna panel in the activated state can be used for signal measurement and can be used for data transmission; an antenna panel in the semi-activated state can be used for signal measurement but may not be used for data transmission; and an antenna panel in the deactivated state cannot be used for signal measurement, and cannot be used for data transmission.

It should be noted that, in the embodiments, that "an antenna panel in the activated state can be used for signal measurement, and can be used for data transmission" may also be understood as "an antenna panel in the activated state can transmit and measure a measurement signal, and can transmit data". In other words, it may be understood as "a network device can schedule an antenna panel in the activated state to perform signal measurement, and can also schedule an antenna panel in the semi-activated state to perform data transmission". The three can be replaced with each other.

That "an antenna panel in the semi-activated state can be used for signal measurement but cannot be used for data transmission" may also be understood as "an antenna panel in the semi-activated state can transmit and measure a measurement signal but cannot transmit data". In other words, it may be understood as "a network device can schedule an antenna panel in the semi-activated state to perform signal measurement, but cannot schedule an antenna panel in the semi-activated state to perform data transmission". The three can be replaced with each other.

That "an antenna panel in the deactivated state cannot be used for signal measurement, and cannot be used for data transmission" may also be understood as "an antenna panel in the deactivated state cannot perform sending or receiving". In other words, it may be understood as "a network device cannot schedule (or indicate) an antenna panel in the deactivated state to perform sending or receiving". In other words, "an antenna panel in the deactivated state is not powered on, and it may be considered that the antenna panel is turned off".

Based on this solution, the activated state, the semi-activated state, and the deactivated state of an antenna panel are defined. Functions or operations that can be implemented in each state are different. Therefore, the terminal device can flexibly manage an antenna panel by controlling a panel state. In addition, in the semi-activated state, the antenna panel can be used for signal measurement, but cannot be used for data transmission. Therefore, when the antenna panel is in the semi-activated state, it can be ensured that the network device does not schedule the antenna panel to perform another operation, for example, data transmission and timing synchronization, thereby reducing energy consumption of the terminal device.

It should be noted that the activated state may also be referred to as an on state, a power-on state, an awake state, or the like; the semi-activated state may also be referred to as a measurement state, a semi-on state, a semi-power-on state, a semi-sleep state, or the like; and the deactivated state may also be referred to as an off state, a power-off state, a sleep state, or the like. Names of the foregoing states are not limited in the embodiments. In addition, names representing the same state can be replaced with each other.

The plurality of antenna panels of the terminal device may further support one or more of the following states: a ready-to-transmit state, a transmission state, an uplink activated state, a downlink activated state, an uplink semi-activated state, and a downlink semi-activated state. An antenna panel in the ready-to-transmit state can be used for transmission, but transmission is not performed currently. An antenna panel in the transmission state can be used for transmission, and transmission is performed currently. An antenna panel in the uplink activated state may perform uplink transmission but may not perform downlink reception. An antenna panel in the downlink activated state may perform downlink transmission but may not perform uplink sending. An antenna panel in the uplink semi-activated state may perform uplink measurement, but cannot perform downlink measurement or data transmission. An antenna panel in the downlink semi-activated state may perform downlink measurement, but cannot perform uplink measurement or data transmission. More states of an antenna panel can be defined, so that the antenna panel can be managed more flexibly by controlling the panel state.

The activated state, the semi-activated state, and the deactivated state may meet a switching rule, and the switching rule may include one or more of the following: the activated state can be switched to the deactivated state; the deactivated state can be switched to the semi-activated state; the semi-activated state can be switched to the activated state; the semi-activated state can be switched to the deactivated state; or the deactivated state can be switched to the activated state. A switching relationship among the activated state, the semi-activated state, and the deactivated state can be defined, so that the terminal device may switch the state of the antenna panel based on the switching relationship, thereby improving management efficiency of the antenna panel.

A terminal device switching a state of a first antenna panel from a first state to a second state may include: The terminal device switches the state of the first antenna panel from the first state to the second state when a first condition is met. Condition-based switching of the state of the antenna panel can be implemented.

The first condition may be that a first timer expires, where the first timer is a timer activated when the first antenna panel enters the first state. In other words, the first timer is activated (or started) when the first antenna panel enters the first state, and the state of the first antenna panel is switched from the first state to the second state when the first timer expires. Duration of the first timer may be understood as maximum duration for which the first antenna panel can be in the first state.

When the first state is the semi-activated state, the second state is the deactivated state, and the first timer expires, the terminal device switches the state of the first antenna panel from the semi-activated state to the deactivated state. Switching from the semi-activated state to the deactivated state can be implemented. For example, after activating the first timer when the first antenna panel enters the semi-activated state, the terminal device may perform signal measurement on the first antenna panel before the first timer expires, and switch the state of the first antenna panel to the deactivated state based on a measurement result, or switch the state of the first antenna panel to the deactivated state based on a measurement result when the first timer expires.

When the first state is the activated state, the second state is the deactivated state, and the first timer expires, the terminal device switches the state of the first antenna panel from the activated state to the deactivated state. Switching from the activated state to the deactivated state can be implemented.

The first condition may include one or more of the following:

(1) The terminal device receives first indication information from a network device.

In other words, the antenna panel management method provided in this embodiment may further include: The terminal device receives first indication information from a network device.

In a possible implementation, the first indication information may include an identifier of the first antenna panel. Because the first state and the second state meet the switching rule, after receiving the identifier of the first antenna panel, the terminal device may determine the first state of the first antenna panel before switching, determine the second state based on the switching rule and the first state, and then switch the state of the first antenna panel from the first state to the second state.

(2) First indication information from a network device is received, and first duration has elapsed since receiving of the first indication information.

(3) First acknowledgment (ACK) information is sent to a network device after first indication information from the network device is received, and second duration has elapsed since sending of ACK information, where the first ACK information is ACK information of the first indication information.

In other words, after the terminal device receives the first indication information from the network device, the antenna panel management method provided in this embodiment may further include: The terminal device sends first ACK information to the network device.

(4) First indication information from a network device is received, where the first indication information indicates a first switching time, and the first switching time arrives.

The first indication information indicates switching of the state of the first antenna panel, or the first indication information indicates switching of the state of the first antenna panel according to a switching rule.

In the foregoing condition (1) to condition (4), because the network device instructs the terminal device to perform state switching, after completing the switching, the terminal device may not send, to the network device, information indicating that the state of the first antenna panel is switched, and the network device may also learn that the state of the first antenna panel is switched, thereby reducing signaling overheads.

(5) The terminal device sends second indication information to a network device.

In other words, the antenna panel management method provided in this embodiment may further include: The terminal device sends second indication information to a network device.

In a possible implementation, the second indication information may include the identifier of the first antenna panel. Because the first state and the second state meet the switching rule, after receiving the identifier of the first antenna panel, the network device may determine the second state after switching based on the first state of the first antenna panel before switching and the switching rule.

(6) Second indication information is sent to a network device, and second ACK information from the network device is received, where the second ACK information is ACK information of the second indication information. The second ACK information is ACK information of the second indication information. The second ACK information indicates that the network device receives the second indication information, and/or indicates that the network device allows the terminal device to switch the state of the first antenna panel.

In other words, after the network device receives the second indication information from the terminal device, the antenna panel management method provided in this embodiment may further include: The terminal device receives second ACK information from a network device.

(7) Second indication information is sent to a network device, and third duration has elapsed since sending of the second indication information.

(8) Second ACK information from a network device is received after second indication information is sent to the network device, and fourth duration has elapsed since receiving of the second ACK information.

(9) Second indication information is sent to a network device, where the second indication information indicates a second switching time, and the second switching time arrives.

The second indication information indicates that the terminal device switches the state of the first antenna panel, or the second indication information indicates that the terminal device is to switch the state of the first antenna panel according to a switching rule.

In the foregoing condition (5) to condition (9), before switching the state of the first antenna panel, the terminal device may send the second indication information to the network device, to indicate that the terminal device is to switch the state of the first antenna panel. Therefore, after completing the switching, the terminal device may not send, to the network device, information indicating that the state of the first antenna panel is switched, thereby reducing signaling overheads.

(10) A second timer expires. The second timer may be a timer activated when the first antenna panel enters the first state.

(11) A switching periodicity of the state arrives.

In condition (11), the state of the first antenna panel can be periodically switched from the first state to the second state. For example, the terminal device may periodically monitor the state of the first antenna panel based on the switching periodicity and may switch the state of the first antenna panel from the first state to the second state when detecting that the state of the first antenna panel is the first state.

In a possible implementation, when the first state is the deactivated state and the second state is the semi-activated state, condition (11) may be used to control state switching of the antenna panel. For example, when the switching periodicity arrives, if the state of the antenna panel is the deactivated state, the state of the antenna panel is switched to the semi-activated state, and signal measurement is performed. If a measurement result obtained through signal measurement does not meet a quality requirement, the state of the antenna panel is switched from the semi-activated state back to the deactivated state. When a next switching periodicity arrives, if the state of the antenna panel is still the deactivated state, the terminal device switches the state of the antenna panel from the deactivated state to the semi-activated state again, performs signal measurement in the semi-activated state, and so on.

In this implementation, the terminal device can periodically switch the antenna panel in the deactivated state to the semi-activated state for signal measurement, and switch the antenna panel to the activated state or the deactivated state based on a measurement result, that is, determine whether to use the antenna panel for transmission or continue to turn off the antenna panel. Because the antenna panel in the semi-activated state can be used for measurement and cannot be used for data transmission, it can be ensured that the network device does not schedule the antenna panel to perform data transmission, timing synchronization, or the like, thereby avoiding unnecessary power consumption.

When the first state is the deactivated state and the second state is the semi-activated state, or the first state is the semi-activated state and the second state is the activated state, or the first state is the activated state and the second state is the deactivated state, or the first state is the deactivated state and the second state is the activated state, or the first state is the semi-activated state and the second state is the deactivated state, or the first state is the activated state and the second state is the semi-activated state, the terminal device switches the state of the first antenna panel from the first state to the second state when the first condition is met.

A terminal device switching a state of a first antenna panel from a first state to a second state may include: The terminal device switches the state of the first antenna panel from the first state to the second state when determining to switch the state of the first antenna panel.

After the terminal device switches the state of the first antenna panel from the first state to the second state, the antenna panel management method may further include: The terminal device sends third indication information to a network device, where the third indication information indicates that the state of the first antenna panel is switched according to a switching rule, and the switching rule includes one or more of the following: the deactivated state can be switched to the semi-activated state; the semi-activated state can be switched to the activated state; the activated state can be switched to the deactivated state; the semi-activated state can be switched to the deactivated state; or the deactivated state can be switched to the activated state.

The third indication information may include the identifier of the first antenna panel. The third indication information does not indicate the state of the first antenna panel after switching.

After receiving the third indication information, the network device may determine the state (namely, the second state) after switching based on the switching rule and the state (namely, the first state) of the first antenna panel before switching, so that the terminal device does not need to indicate the state after switching to the network device, thereby reducing signaling overheads.

When the second state is the semi-activated or activated state, or when the state of the antenna panel is switched to the semi-activated or activated state, the antenna panel management method may further include: The terminal device sends second information to a network device, where the second information includes one or more of the following: the identifier of the first antenna panel, a quantity of antenna panels in the activated state in the plurality of antenna panels of the terminal device, a quantity of antenna panels in the semi-activated state in the plurality of antenna panels of the terminal device, reporting configuration information, resource configuration information, resource set information, resource information, a resource type, a reporting amount, a reporting time domain type, a reporting frequency domain granularity, a group reporting indication, a repetition parameter indication, quasi co-location QCL information, transmission configuration index state TCI-state information, indication information, time information, or purpose information. The indication information indicates that a newly added antenna panel enters the activated state or the semi-activated state, and the time information indicates maximum duration for which the first antenna panel is in the activated state or the semi-activated state. The first antenna panel is to be switched to the deactivated state after the duration. The purpose information indicates a purpose of this measurement. For example, this measurement is for measurement of a newly turned-on antenna panel. The terminal device can actively request to perform signal measurement, so that the network device sends a downlink reference signal resource or configures a downlink reference signal resource based on the second information.

The first antenna panel is associated with a first configuration, the first configuration is used for signal measurement corresponding to the first antenna panel, and the first configuration is activated when the state of the first antenna panel is switched to the activated state or the semi-activated state; or the first configuration is deactivated when the state of the first antenna panel is switched to the deactivated state; and the first configuration includes one or more of the following: a reporting configuration, a resource configuration, a resource set, or a resource. Because the antenna panel is associated with the configuration used for signal measurement, when the antenna panel is switched to the activated state or the semi-activated state, the associated configuration is activated, and when the antenna panel is switched to the deactivated state, the associated configuration is deactivated. Therefore, the related configuration does not need to be activated or deactivated by using signaling, thereby reducing signaling overheads.

The antenna panel management method may further include: The terminal device sends SRS resources included in a first SRS resource set, where a quantity of SRS resources included in the first SRS resource set is equal to a quantity of antenna panels that can be used for receiving in the plurality of antenna panels of the terminal device, and the first SRS resource set is one SRS resource set of one or more SRS resource sets configured by the network device for the terminal device.

The antenna panel management method may further include: The terminal device sends N SRS resources in one or more SRS resource sets, where N is a quantity of antenna panels that can be used for receiving in the plurality of antenna panels of the terminal device, the one or more SRS resource sets are configured by the network device for the terminal device, and a quantity of SRS resources included in the SRS resource set is equal to a quantity of antenna panels of the terminal device.

The network device may determine, based on current states of the plurality of antenna panels of the terminal device, SRS resources sent by the terminal device, and receive the SRS resources at corresponding locations, to perform uplink and downlink channel assessment.

When the first antenna panel is in the deactivated state, the method may further include: releasing one or more of the following parameters corresponding to the first antenna panel: a reporting configuration, a resource configuration, a resource set, a resource, a hybrid automatic repeat request (HARQ) process, QCL information, TCI-state information, a timer, a physical uplink control channel (PUCCH), a physical uplink shared channel (PUSCH), a control resource set (CORESET), a CORESET group, a physical downlink control channel (PDCCH), a physical random access channel (PRACH) resource, a timing advance group (TAG) configuration, a beam failure detection resource, an alternative beam resource, a beam failure recovery resource, an alternative beam identification resource, a cell, or a bandwidth part (BWP). When the antenna panel is in the deactivated state, a resource corresponding to the antenna panel may be released, and the like, to avoid a problem that the antenna panel continues to occupy a resource and the resource cannot be fully used, thereby improving resource utilization.

The antenna panel management method may further include: The terminal device sends terminal capability parameter information to a network device, where the terminal capability parameter information includes one or more of the following: a multi-panel transmission manner supported by the terminal device, where the multi-panel transmission manner includes: turning on a single antenna panel for transmission, turning on a plurality of antenna panels but using a single panel for transmission at a time, or simultaneously using a plurality of antenna panels for transmission; a multi-panel sending manner supported by the terminal device, where the multi-panel sending manner includes: turning on a single antenna panel for sending, turning on a plurality of antenna panels but using a single panel for sending at a time, or simultaneously using a plurality of antenna panels for sending; a multi-panel receiving manner supported by the terminal device, where the multi-panel receiving manner includes: turning on a single antenna panel for receiving, turning on a plurality of antenna panels but using a single panel for receiving at a time, or simultaneously using a plurality of antenna panels for receiving; a quantity of antenna panels that can be in the activated state simultaneously; a quantity of antenna panels that can be in the semi-activated state simultaneously; a quantity of states supported by an antenna panel; duration of a timer for state switching of an antenna panel; a periodicity for state switching of an antenna panel; a quantity of antenna panels used for downlink transmission; a quantity of antenna panels used for uplink transmission; an antenna panel turning-on periodicity; or an effective time of state switching of an antenna panel.

According to a second aspect, an antenna panel management method is provided. In this solution, a network device sends first indication information to a terminal device, where the first indication information indicates switching of a state of a first antenna panel of the terminal device, or in other words, the first indication information indicates switching of the state of the first antenna panel according to a switching rule. The first antenna panel supports one or more of an activated state, a semi-activated state, or a deactivated state. An antenna panel in the activated state can be used for signal measurement and data transmission; an antenna panel in the semi-activated state can be used for signal measurement, but may not be used for data transmission; and an antenna panel in the deactivated state cannot be used for signal measurement and data transmission. Based on this solution, the network device can indicate the terminal device to switch the state of the antenna panel of the terminal device, to manage a plurality of antenna panels of the terminal device.

The antenna panel management method may further include: The network device receives first ACK information from the terminal device, where the first ACK information indicates that the terminal device receives the first indication information, and/or that the terminal device is to switch the state of the first antenna panel based on an indication of the first indication information.

According to a third aspect, an antenna panel management method is provided. In this solution, a network device receives second indication information from a terminal device, where the second indication information indicates that the terminal device switches a state of a first antenna panel, or in other words, the second indication information indicates that the terminal device is to switch the state of the first antenna panel according to a switching rule. The network device determines, based on the second indication information, that the state of the first antenna panel is switched to a second state. Based on this solution, the network device may learn that the terminal device is to switch the state of the antenna panel.

The antenna panel management method may further include: The network device sends second ACK information to the terminal device, where the second ACK information is ACK information of the second indication information. The second ACK information indicates that the network device receives the second indication information, and/or indicates that the network device allows the terminal device to switch the state of the first antenna panel.

With reference to the second aspect or the third aspect, the antenna panel management method may further include: The network device receives second information from the terminal device, where the second information includes one or more of the following: an identifier of the first antenna panel, a quantity of antenna panels in the activated state in the plurality of antenna panels of the terminal device, a quantity of antenna panels in the semi-activated state in the plurality of antenna panels of the terminal device, reporting configuration information, resource configuration information, resource set information, resource information, a resource type, a reporting amount, a reporting time domain type, a reporting frequency domain granularity, a group reporting indication, a repetition parameter indication, quasi co-location QCL information, transmission configuration index state TCI-state information, indication information, time information, or purpose information. The indication information indicates that a newly added antenna panel enters the activated state or the semi-activated state, and the time information indicates maximum duration for which the first antenna panel is in the activated state or the semi-activated state. The first antenna panel is to be switched to the deactivated state after the duration. The purpose information indicates a purpose of this measurement. For example, this measurement is for measurement of a newly turned-on antenna panel. The terminal device can actively request to perform signal measurement, so that the network device sends a downlink reference signal resource or configures a downlink reference signal resource based on the second information.

With reference to the second aspect or the third aspect, the antenna panel management method may further include: The network device configures one or more SRS resource sets for the terminal device, where a quantity of SRS resource sets is equal to a quantity of antenna panels of the terminal device, and different SRS resource sets include different quantities of SRS resources.

With reference to the second aspect or the third aspect, the antenna panel management method may further include: The network device configures one or more SRS resource sets for the terminal device, where a quantity of SRS resources included in each of the one or more SRS resource sets is equal to a quantity of antenna panels of the terminal device.

According to a fourth aspect, an antenna panel management method is provided. In this solution, a network device sends a first message to a terminal device. The first message indicates states of one or more antenna panels. The state may be a current state of an antenna panel determined by the network device, or may be a state that is indicated by the network device and to which the antenna panel is to be switched, that is, the network device instructs the terminal device to switch the state of the antenna panel to the state indicated by the first message. Based on this solution, the network device can indicate the terminal device to switch the state of the antenna panel of the terminal device, to manage a plurality of antenna panels of the terminal device.

According to a fifth aspect, an antenna panel management method is provided. In this solution, a terminal device receives a first message from a network device. The first message indicates states of one or more antenna panels. The state may be a current state of an antenna panel determined by the network device, or may be a state that is indicated by the network device and to which the antenna panel is to be switched, that is, the network device instructs the terminal device to switch the state of the antenna panel to the state indicated by the first message. When a current state of an antenna panel is different from the state that is of the panel and that is indicated by the first message, the terminal device switches the state of the antenna panel to the state that is of the panel and that is indicated by the first message.

With reference to the fourth aspect or the fifth aspect, the first message includes identifiers of one or more antenna panels and a state of each of the one or more antenna panels.

With reference to the fourth aspect or the fifth aspect, the first message may include one or more states, and an identifier of an antenna panel corresponding to each of the one or more states.

With reference to the fourth aspect or the fifth aspect, the first message may include one or more states, and an identifier of a newly added antenna panel corresponding to each of the one or more states.

With reference to the fourth aspect or the fifth aspect, the first message may include identifiers of one or more antenna panels and may not include states corresponding to the identifiers of the one or more antenna panels.

With reference to the fourth aspect or the fifth aspect, the first message may include a plurality of states, and does not include an identifier of an antenna panel corresponding to each of the plurality of states. A quantity of the plurality of states is the same as the quantity of antenna panels of the terminal device.

According to a sixth aspect, an antenna panel management method is provided. In this solution, a terminal device determines K states supported by a plurality of antenna panels of the terminal device, where the K states include one or more of an activated state, a semi-activated state, or a deactivated state, and K is a positive integer greater than 1. The terminal device manages a panel state of a first antenna panel based on a state switching policy, where the first antenna panel is one or more of the plurality of antenna panels. An antenna panel in the activated state can be used for signal measurement, and can be used for data transmission; an antenna panel in the semi-activated state can be used for signal measurement, but cannot be used for data transmission; and an antenna panel in the deactivated state cannot be used for signal measurement, and cannot be used for data transmission.

Based on this solution, the activated state, the semi-activated state, and the deactivated state of an antenna panel are defined. Functions or operations that can be implemented in each state are different. Therefore, the terminal device can flexibly manage an antenna panel by managing a panel state based on the state switching policy. In addition, in the semi-activated state, the antenna panel can be used for signal measurement, but cannot be used for data transmission. Therefore, when the antenna panel is in the semi-activated state, it can be ensured that the network device does not schedule the antenna panel to perform another operation, for example, data transmission and timing synchronization, thereby reducing energy consumption of the terminal device.

According to a seventh aspect, a communication apparatus is provided, to implement the foregoing methods. The communication apparatus may be the foregoing terminal device in the first aspect or the fifth aspect or the sixth aspect, or an apparatus including the terminal device, or an apparatus included in the terminal device, for example, a chip; or the communication apparatus may be the foregoing network device in the second aspect to the fourth aspect, or an apparatus including the network device, or an apparatus included in the network device. The communication apparatus includes a corresponding module, unit, or structures for implementing the foregoing method. The module, unit, or structures may be implemented by hardware, software, or hardware executing corresponding software. The hardware or the software includes one or more modules or units corresponding to the foregoing functions.

According to an eighth aspect, a communication apparatus is provided. The communication apparatus includes a processor and a memory. The memory is configured to store computer instructions. When the processor executes the instructions, the communication apparatus is enabled to perform the method according to any one of the foregoing aspects. The communication apparatus may be the foregoing terminal device in the first aspect or the fifth aspect or the sixth aspect, or an apparatus including the terminal device, or an apparatus included in the terminal device, for example, a chip; or the communication apparatus may be the foregoing network device in the second aspect to the fourth aspect, or an apparatus including the network device, or an apparatus included in the network device.

According to a ninth aspect, a communication apparatus is provided, including a processor and an interface circuit. The interface circuit may be a code/data read/write interface circuit, and the interface circuit is configured to receive computer-executable instructions (the computer-executable instructions are stored in a memory, and may be read from the memory directly or through another component) and transmit the computer-executable instructions to the processor. The processor is configured to run the computer-executable instructions to perform the method according to any one of the foregoing aspects. The communication apparatus may be the foregoing terminal device in the first aspect or the fifth aspect or the sixth aspect, or an apparatus including the terminal device, or an apparatus included in the terminal device, for example, a chip; or the communication apparatus may be the foregoing network device in the second aspect to the fourth aspect, or an apparatus including the network device, or an apparatus included in the network device.

According to a tenth aspect, a communication apparatus is provided, including a processor, where the processor is configured to: read a computer program or instructions in a memory, and perform, according to the computer program or the instructions, the method according to any one of the foregoing aspects. The memory may be coupled to the processor or may be independent of the processor. The communication apparatus may be the foregoing terminal device in the first aspect or the fifth aspect or the sixth aspect, or an apparatus including the terminal device, or an apparatus included in the terminal device, for example, a chip; or the communication apparatus may be the foregoing network device in the second aspect to the fourth aspect, or an apparatus including the network device, or an apparatus included in the network device.

According to an eleventh aspect, a computer-readable storage medium is provided. The computer-readable storage medium stores instructions. When the instructions are run on a communication apparatus, the communication apparatus is enabled to perform the method according to any one of the foregoing aspects. The communication apparatus may be the foregoing terminal device in the first aspect or the fifth aspect or the sixth aspect, or an apparatus including the terminal device, or an apparatus included in the terminal device, for example, a chip; or the communication apparatus may be the foregoing network device in the second aspect to the fourth aspect, or an apparatus including the network device, or an apparatus included in the network device.

According to a twelfth aspect, a computer program product including instructions is provided. When the computer program product runs on a communication apparatus, the communication apparatus is enabled to perform the method according to any one of the foregoing aspects. The communication apparatus may be the foregoing terminal device in the first aspect or the fifth aspect or the sixth aspect, or an apparatus including the terminal device, or an apparatus included in the terminal device, for example, a chip; or the communication apparatus may be the foregoing network device in the second aspect to the fourth aspect, or an apparatus including the network device, or an apparatus included in the network device.

According to a thirteenth aspect, a communication apparatus (where for example, the communication apparatus may be a chip or a chip system) is provided. The communication apparatus includes a processor, configured to implement the function in any one of the foregoing aspects. The communication apparatus may further include a memory and the memory may be configured to store necessary program instructions and data. When the communication apparatus is the chip system, the communication apparatus may include a chip, or may include a chip and another discrete component.

For the seventh aspect to the thirteenth aspect, refer to the first aspect to the fifth aspect. Details are not described herein again.

According to a fourteenth aspect, a communication system is provided. The communication system includes the terminal device in the foregoing aspects and the network device in the foregoing aspects.

DETAILED DESCRIPTION OF THE EMBODIMENTS

Figure 1A:
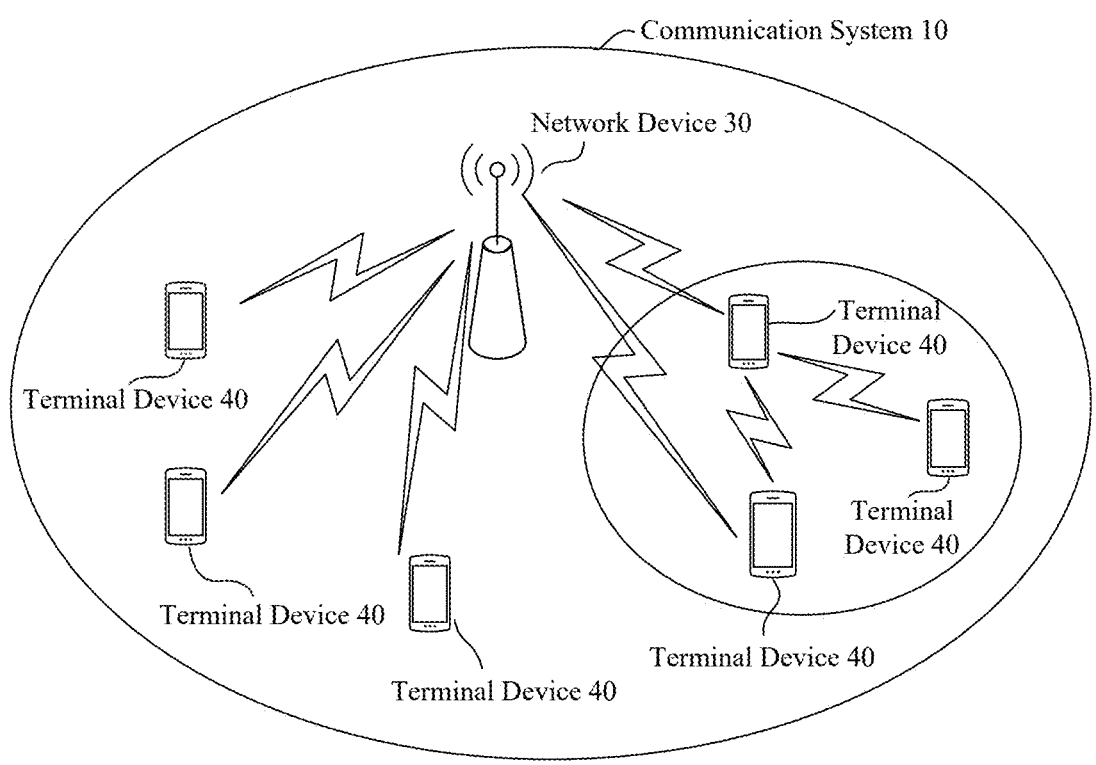
FIG. 1a is a schematic diagram of a structure of a communication system according to an embodiment.

For ease of understanding solutions in the embodiments, brief descriptions or definitions of related technologies are first provided as follows:

1. Antenna Panel

In the embodiments, unless otherwise specified, an antenna panel is an antenna panel of a terminal device.

In the protocol, an antenna panel may be represented by a panel, a panel index, or the like. In addition, an antenna panel may also be implicitly represented in another manner. For example, the antenna panel may also be represented by using an antenna port or an antenna port group; or may be represented by using a resource or a resource group; or may be represented by using a channel; or may be represented by using a beam (for example, a control channel beam), a quasi co-location (QCL), a transmission configuration index state (TCI-state), or a spatial relation; or may be represented by using an index configured in a QCL, a TCI-state, or a spatial relation; or may be represented by using a beam group, a QCL group, a TCI-state group, a spatial relation group, or the like; or may be represented by using a control channel or a control channel group (control-resource set (CORESET) group). In other words, the antenna panel/panel and the foregoing content can be replaced with each other.

The antenna port may be a channel state information reference signal (CSI-RS) port, a sounding reference signal (SRS) port, a demodulation reference signal (DMRS) port, a phase tracking reference signal (PTRS) port, a cell reference signal (CRS) port, a time-frequency tracking reference signal (TRS) port, a synchronization signal and physical broadcast channel block (SS/PBCH block) port, or the like. The SS/PBCH block may be referred to as a synchronization signal block (SSB) for short.

The resource may be a CSI-RS resource, an SRS resource, a DMRS resource, a PTRS resource, a CRS resource, a TRS resource, an SSB resource, or the like.

The channel may be a physical uplink control channel (PUCCH), a physical uplink shared channel (PUSCH), a physical random access channel (PRACH), a physical downlink shared channel (PDSCH), a physical downlink control channel (PDCCH), a physical broadcast channel (PBCH), or the like.

2. Beam

One antenna panel generally has one or more antennas, and these antennas are arranged into an antenna array to perform beamforming, to form a beam. The antenna array may generate beams pointing to different directions. A plurality of beams may be formed on each antenna panel, and a best beam used by the antenna panel may be determined through beam measurement.

A beam generally corresponds to a resource. For example, during beam measurement, different beams are measured by using different resources, and measured resource quality is quality of a beam corresponding to the resource. During data transmission, beam information is also indicated by using a corresponding resource. For example, a network device indicates information about a PDSCH beam of the terminal device through a TCI field in DCI.

3. Resource Configuration, Resource Set, Resource, and Reporting Configuration

The network device may send measurement configuration information to the terminal device. The measurement configuration information is sent by the network device to the terminal by using radio resource control (RRC) signaling, and includes two parts: resource configuration information and reporting configuration information.

The resource configuration information may be information related to a resource to be measured and may be configured by using a three-level structure (resource configuration resourceConfig-resource set resourceSet-resource resource) in a protocol. The network device may configure one or more resource configurations (where the resource configuration resourceConfig may also be written as resourceSetting) for the terminal device. Each resource configuration includes one or more resource sets, and each resource set may include one or more resources. Each resource configuration/resource set/resource includes an index of the resource configuration/resource set/resource. In addition, some other parameters are further included, for example, a resource periodicity and a signal class corresponding to the resource.

The reporting configuration information may be information related to reporting of a measurement result and may be configured through reporting configuration ReportConfig in the protocol. The network device may configure one or more reporting configurations ReportConfig for the terminal device, and each reporting configuration includes information related to reporting such as a reporting parameter, a reporting time and periodicity, and a reporting format. In addition, the reporting configuration further includes the index of the resource configuration, to indicate a measurement configuration by which a reported result is measured.

The following shows an example of a format of the resource configuration and the reporting configuration in the R15 protocol (where some irrelevant parameters may be omitted), to facilitate further understanding.

It should be noted that content in the following < > represents explanations of corresponding parameters.

```
Resource configuration {
    resource configuration index (csi-ResourceConfigId)
    resource set list (csi-RS-ResourceSetList) {
        nzp-CSI-RS-SSB resource set list
        (nzp-CSI-RS-SSB-ResourceSetList) {
            nzp-CSI-RS resource set list (nzp-CSI-RS-SSB-ResourceSetList)
            and/or
            csi-SSB resource set list (csi-SSB-ResourceSetList)
        }
        or
        csi-IM resource set list (csi-IM-ResourceSetList)
    }
    bandwidth identifier (bwp-Id)
    resource type (resourceType) < indicates a time domain sending
    feature of a resource in the resource configuration, for example, periodic
    sending, semi-persistent sending, or aperiodic sending >
    ......
}
```

It may be understood that the resource set above includes one or more resources, the nzp-CSI-RS resource set includes one or more nzp-CSI-RS resources, the csi-SSB resource set includes one or more SSB resources, and the csi-IM resource set includes one or more csi-IM resources. There are many types of resource sets, and details are not provided herein.

```
Reporting configuration (ReportConfig) {
    reporting configuration index (reportConfigId)
    index of a resource configuration used to measure channel
        information
    (resourcesForChannelMeasurement)
    index of a resource configuration used to measure interference
        information
    (csi-IM-ResourcesForInterference) < resource types included in the
    resource configuration are all csi-IM resources >
    index of a resource configuration used to measure interference
        information
    (nzp-CSI-RS-ResourcesForInterference) < resource types included in the
    resource configuration are all nzp-CSI-RS >
        Reporting quantity (reportQuantity) < for example, CQI and RSRP >
        group-based reporting criteria (groupBasedBeamReporting): < may
    be configured to be enabled or disabled >
}
```

-continued

4. SRS Resource Set

The network device may configure, for the terminal device by using the SRS configuration information, one or more SRS resource sets (SRS-ResourceSet) used for uplink beam management. Each SRS resource set includes one or more SRS resources (SRS-Resource). Each SRS resource is associated with one beam. Each SRS resource includes one SRS signal, and uplink beam measurement may be performed by measuring SRS signals corresponding to these SRS resources.

The following shows an example of a format of the SRS resource configuration in the R15 protocol (where some irrelevant content may be omitted), to facilitate further understanding.

```
SRS resource set (SRS-ResourceSet) {
    SRS resource set index (srs-ResourceSetId)
    SRS resources included in the SRS resource set (srs-ResourceIdList)
    SRS resource set type (resourceType) {
        aperiodic (aperiodic) { }
        semi-persistent (semi-persistent) { }
        periodic (periodic) { }
    }
    usage (usage) of the SRS resource set < for example, beam
management, codebook-based uplink transmission, non-codebook-based
uplink transmission, and uplink channel measurement >
}
SRS resource (SRS-Resource) {
    SRS resource index (srs-ResourceId)
    quantity of antenna ports of the SRS resource (nrofSRS-Ports)
    time-frequency resource location corresponding to the SRS resource
(resourceMapping)
    SRS resource type (resourceType) {
        aperiodic (aperiodic) { }
        semi-persistent (semi-persistent) { }
        periodic (periodic) { }
    }
    spatial information of an SRS (spatialRelationInfo) < indicates a
transmit spatial parameter of the SRS resource >
    ......
}
```

The following describes the embodiments with reference to the accompanying drawings. In the descriptions, unless otherwise specified, "l" indicates an "or" relationship between associated objects. For example, A/B may indicate A or B. "And/or" describes only an association relationship between associated objects and indicates that three relationships may exist. For example, A and/or B may indicate the following three cases: only A exists, both A and B exist, and only B exists, where A and B may be singular or plural. In addition, in the descriptions, unless otherwise specified, "at least one" means one or more, and "a plurality of" means two or more. At least one of the following items (pieces) or a similar expression thereof refers to any combination of these items, including any combination of singular items (pieces) or plural items (pieces). For example, at least one item (piece) of a, b, or c may indicate a, b, c, a-b, a-c, b-c, or a-b-c, where "–" indicates that associated objects are in an "and" relationship, and a, b, and c may be singular or plural.

In addition, to clearly describe the embodiments, terms such as "first" and "second" are used in the embodiments to distinguish between same items or similar items that may have the same functions or purposes. A person skilled in the art may understand that the terms such as "first" and "second" do not limit a quantity or an execution sequence, and the terms such as "first" and "second" do not indicate a definite difference.

FIG. 1a shows a communication system 10 according to an embodiment. The communication system 10 includes at least one network device 30 and one or more terminal devices 40 connected to the network device 30. Optionally, different terminal devices 40 may communicate with each other.

Figure 1B:
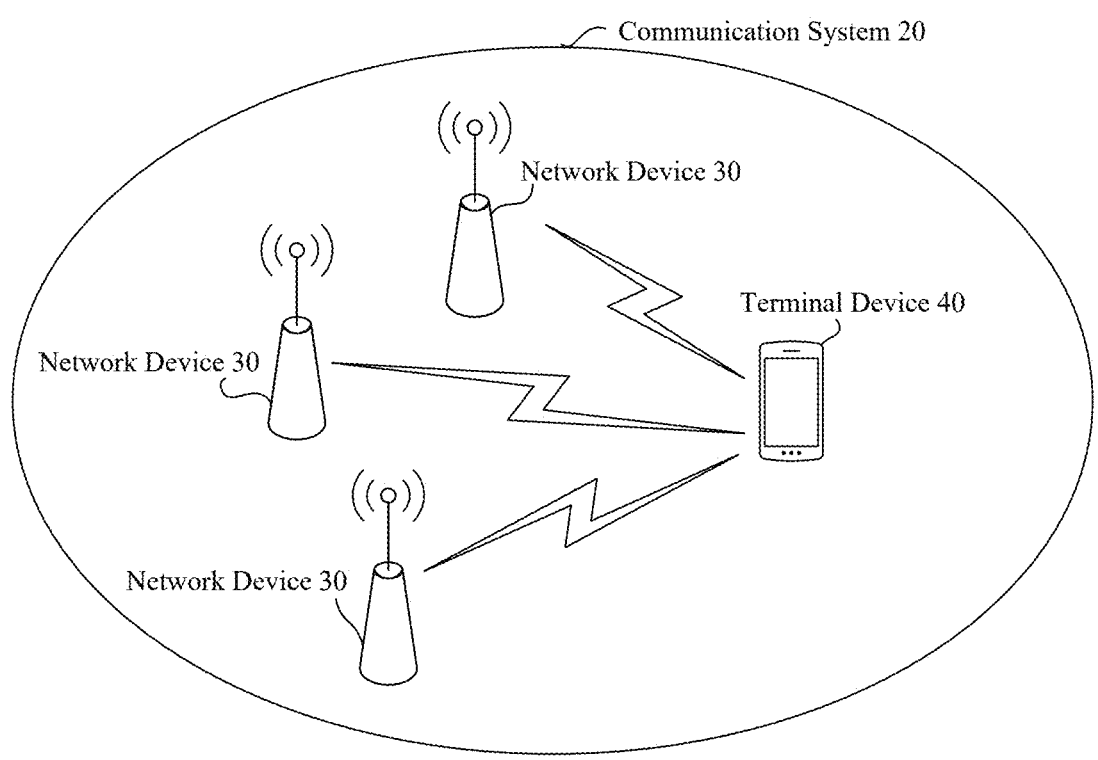
FIG. 1B is a schematic diagram of a structure of another communication system according to an embodiment.

Alternatively, FIG. 1B shows another communication system 20 according to an embodiment. The communication system 20 includes at least one terminal device 40 and one or more network devices 30 connected to the terminal device 40. Optionally, different network devices 30 may communicate with each other.

Optionally, the network device 30 in this embodiment is a device for connecting the terminal device 40 to a wireless network, and may be an evolved NodeB (eNB) in long term evolution (LTE), a base station in a $5^{th}$ generation (5G) network or a future evolved public land mobile network (pPLMN), a broadband network gateway (BNG), an aggregation switch, or a non-third generation partnership project (3GPP) access device. The network device 30 in this embodiment may be alternatively a wireless controller in a cloud radio access network (CRAN), a transmission and reception point (TRP), a device including a TRP, or the like. This is not limited in the embodiments. Optionally, the base station in the embodiments may include base stations in various forms, for example, a macro base station, a micro base station (which is also referred to as a small cell), a relay station, and an access point. This is not limited in the embodiments.

Optionally, the terminal device 40 in the embodiments may be a device, such as a terminal or a chip that can be used in the terminal, configured to implement a wireless communication function. The terminal may be user equipment (UE), an access terminal, a terminal unit, a terminal station, a mobile station, a remote station, a remote terminal, a mobile device, a wireless communication device, a terminal agent, a terminal apparatus, or the like in the 5G network or a future evolved PLMN. The access terminal may be a cellular phone, a cordless phone, a session initiation protocol (SIP) phone, a wireless local loop (WLL) station, a personal digital assistant (PDA), a handheld device or a computing device having a wireless communication function, another processing device, vehicle-mounted device, or wearable device connected to a wireless modem, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. The terminal may be mobile or at a fixed location.

Optionally, the network device 30 and the terminal device 40 in this embodiment may also be referred to as communication apparatuses, and each may be a general-purpose device or a dedicated device. This is not limited in the embodiments.

Figure 2:
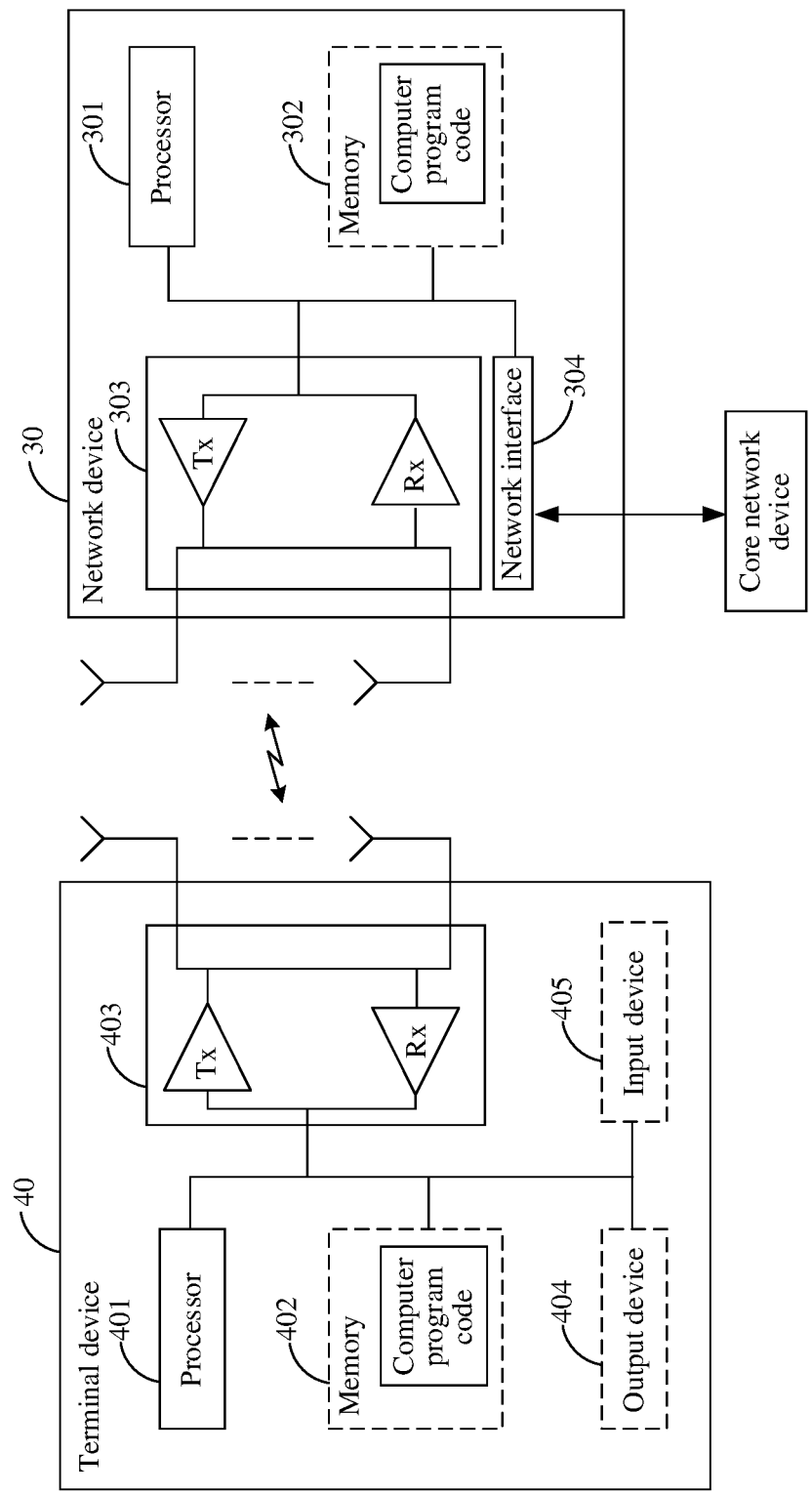
FIG. 2 is a schematic diagram of structures of a terminal device and a network device according to an embodiment.

Optionally, FIG. 2 is a schematic diagram of structures of the network device 30 and the terminal device 40 according to this embodiment.

The terminal device 40 includes at least one processor (an example in which one processor 401 is included is used for description in FIG. 2) and at least one transceiver (an example in which one transceiver 403 is included is used for description in FIG. 2). Optionally, the terminal device 40 may further include at least one memory (an example in which one memory 402 is included is used for description in FIG. 2), at least one output device (an example in which one output device 404 is included is used for description in FIG. 2), and at least one input device (an example in which one input device 405 is included is used for description in FIG. 2).

The processor 401, the memory 402, and the transceiver 403 are connected to each other through a communication line. The communication line may include a path for transmitting information between the foregoing components.

The processor 401 may be a general-purpose central processing unit (CPU), a microprocessor, an application-specific integrated circuit (ASIC), or one or more integrated circuits configured to control program execution. During implementation, in an embodiment, the processor 401 may alternatively include a plurality of CPUs, and the processor 401 may be a single-core (single-CPU) processor or a multi-core (multi-CPU) processor. The processor herein may be one or more devices, circuits, or processing cores configured to process data (for example, computer program instructions).

The memory 402 may be an apparatus having a storage function. For example, the memory may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory is not limited thereto. The memory 402 may exist independently and may be connected to the processor 401 through the communication line. The memory 402 may be alternatively integrated with the processor 401.

The memory 402 is configured to store computer-executable instructions and the processor 401 controls execution of the computer-executable instructions. The processor 401 may be configured to execute the computer-executable instructions stored in the memory 402, to implement the methods in the embodiments.

Optionally, the computer-executable instructions in the embodiments may also be referred to as application program code or computer program code. This is not limited in the embodiments.

The transceiver 403 may use any apparatus such as a transceiver and may be configured to communicate with another device or a communication network such as the Ethernet, a radio access network (RAN), or a wireless local area network (WLAN). The transceiver 403 includes a transmitter (Tx) and a receiver (Rx).

The output device 404 may communicate with the processor 401 and may display information in a plurality of manners. For example, the output device 404 may be a liquid crystal display (LCD), a light emitting diode (LED) display device, a cathode ray tube (CRT) display device, a projector (projector), or the like.

The input device 405 communicates with the processor 401, and may receive an input from a user in a plurality of manners. For example, the input device 405 may be a mouse, a keyboard, a touchscreen device, or a sensor device.

The network device 30 includes at least one processor (an example in which one processor 301 is included is used for description in FIG. 2), at least one transceiver (an example in which one transceiver 303 is included is used for description in FIG. 2), and at least one network interface (an example in which one network interface 304 is included is used for description in FIG. 2). Optionally, the network device 30 may further include at least one memory (in FIG. 2, one memory 302 is included as an example for description). The processor 301, the memory 302, the transceiver 303, and the network interface 304 are connected through a communication line. The network interface 304 is configured to connect to a core network device through a link (for example, an S1 interface), or connect to a network interface of another network device through a wired or wireless link (for example, an X2 interface) (not shown in FIG. 2). This is not limited in embodiments. In addition, for descriptions about the processor 301, the memory 302, and the transceiver 303, refer to descriptions about the processor 401, the memory 402, and the transceiver 403 in the terminal device 40. Details are not described herein again.

Figure 3:
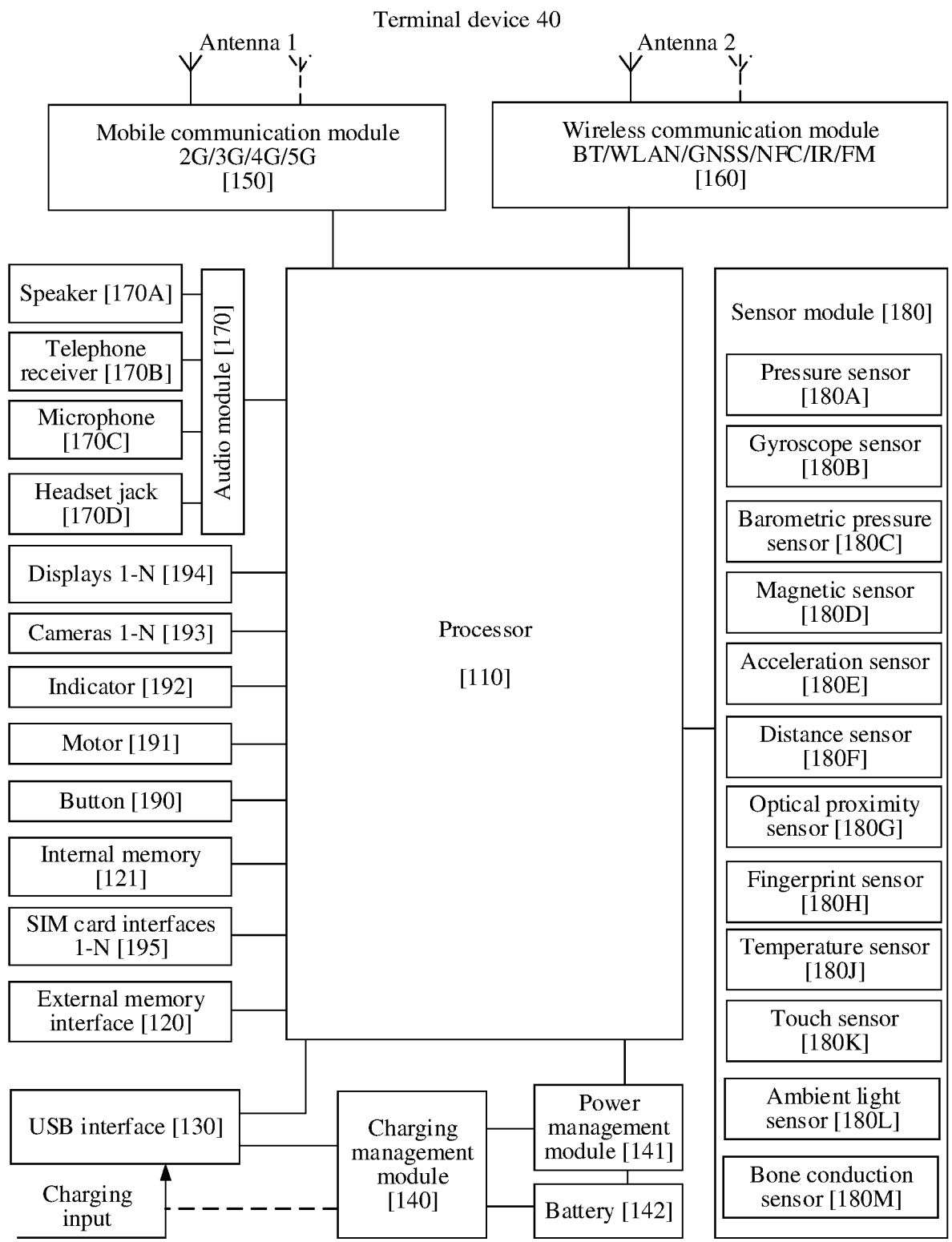
FIG. 3 is a schematic diagram of a structure of another terminal device according to an embodiment.

With reference to the schematic diagram of the structure of the terminal device 40 shown in FIG. 2, for example, FIG. 3 is a structural form of the terminal device 40 according to an embodiment.

In some embodiments, a function of the processor 401 in FIG. 2 may be implemented by a processor 110 in FIG. 3.

In some embodiments, a function of the transceiver 403 in FIG. 2 may be implemented through an antenna 1, an antenna 2, a mobile communication module 150, a wireless communication module 160, and the like in FIG. 3.

The antenna 1 and the antenna 2 are configured to transmit and receive electromagnetic wave signals. Each antenna in the terminal device 40 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a solution used for wireless communication including 2G/3G/4G/5G, and the like on the terminal device 40. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to a modem processor for demodulation. The mobile communication module 150 may further amplify a signal modulated by the modem processor and may convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The wireless communication module 160 may provide a solution used for wireless communication including a wireless local area network (WLAN) (for example, a Wi-Fi network), Bluetooth (BT), a global navigational satellite system (GNSS), frequency modulation (FM), near field communication (NFC), an infrared (IR) technology, and the like on the terminal device 40. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the terminal device 40 is coupled to the mobile communication module 150, and the antenna 2 is coupled to the wireless communication module 160, so that the terminal device 40 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), LTE, BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), or a satellite based augmentation system (SBAS).

In some embodiments, a function of the memory 402 in FIG. 2 may be implemented by an internal memory 121 in FIG. 3, an external memory (for example, a Micro SD card) connected to an external memory interface 120, or the like.

In some embodiments, a function of the output device 404 in FIG. 2 may be implemented by a display 194 in FIG. 3. The display 194 is configured to display an image, a video, and the like. The display 194 includes a display panel.

In some embodiments, a function of the input device 405 in FIG. 2 may be implemented by a mouse, a keyboard, a touchscreen device, or a sensor module 180 in FIG. 3. For example, as shown in FIG. 3, the sensor module 180 may include one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M. This is not limited in the embodiments.

In some embodiments, as shown in FIG. 3, the terminal device 40 may further include one or more of an audio module 170, a camera 193, an indicator 192, a motor 191, a button 190, a SIM card interface 195, a USB interface 130, a charging management module 140, a power management module 141, and a battery 142. The audio module 170 may be connected to a speaker 170A (also referred to as a "loudspeaker"), a telephone receiver 170B (also referred to as a "handset"), a microphone 170C (also referred to as a "mic" or "mike"), a headset jack 170D, or the like. This is not limited in the embodiments.

It may be understood that the structure shown in FIG. 3 constitutes no limitation on the terminal device 40. For example, in some other embodiments, the terminal device 40 may include more or fewer components than those shown in the figure, or some components may be combined, some components may be split, or the components may be differently arranged. The components shown in the figure may be implemented by using hardware, software, or a combination of software and hardware.

The following describes in detail the antenna panel management method provided in the embodiments with reference to the accompanying drawings.

It should be noted that names of messages between network elements, names of parameters in the messages, or the like in the following embodiments are merely examples, and there may be other names during implementation. This is not limited in the embodiments.

It may be understood that in the embodiments, the terminal device and/or the network device may perform all or a part of the steps in the embodiments. These steps or operations are merely examples. In the embodiments, other operations or variations of various operations may be further performed. In addition, the steps may be performed in a sequence different from a sequence presented in the embodiments, and not all the operations in the embodiments may be necessarily to be performed.

Figure 4:
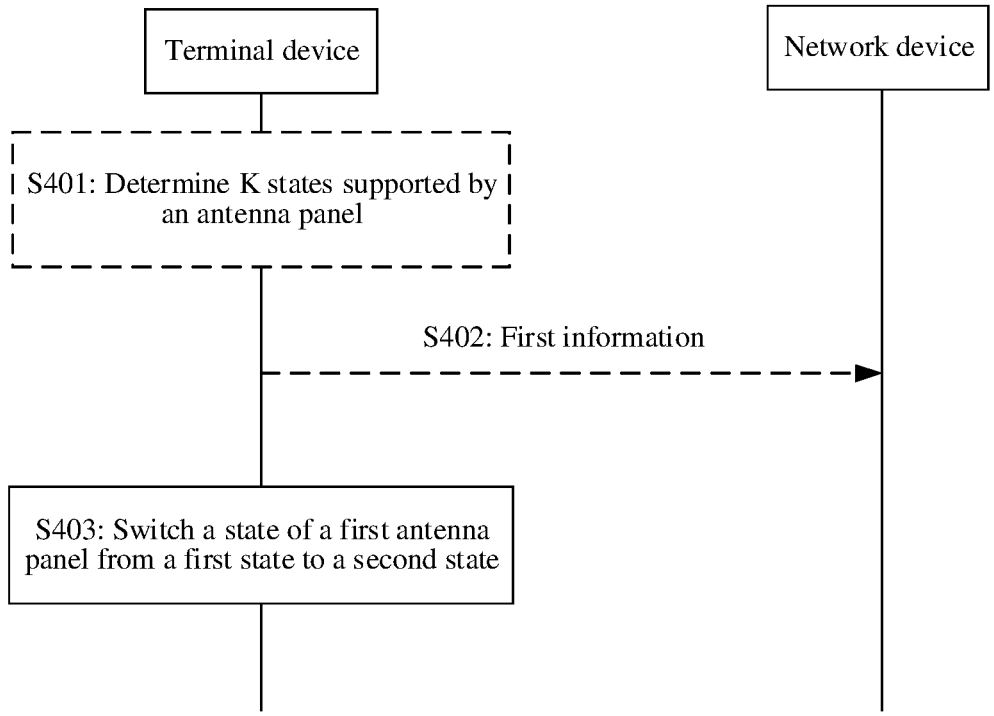
FIG. 4 is a schematic flowchart of an antenna panel management method according to an embodiment.

FIG. 4 shows an antenna panel management method according to an embodiment. The antenna panel management method includes the following steps.

S401: A terminal device determines K states supported by an antenna panel.

The terminal device includes one or more antenna panels. States of the antenna panel may be classified into K states, or in other words, the antenna panel supports K states. Functions of the antenna panel are different in different states. In other words, the antenna panel can perform different operations in different states. In other words, the network device can schedule the antenna panel to perform different operations in different states.

The K states include K of the following plurality of states.

(1) Deactivated state: An antenna panel in the deactivated state cannot be used for signal measurement or data transmission. In other words, an antenna panel in the deactivated state cannot perform sending or receiving. In other words, a network device cannot schedule (or indicate) an antenna panel in the deactivated state to perform sending or receiving. In other words, the antenna panel in the deactivated state is not powered on, and it may be considered that the antenna panel is turned off.

In the embodiments, the deactivated state may also be referred to as an off state, a power-off state, a sleep state, or the like. The name of the state is not limited in the embodiments. In addition, the names can be replaced with each other.

It should be noted that, in the embodiments, a type of "transmission" may be uplink transmission and/or downlink transmission, and an operation of "transmission" may include sending and/or receiving. This is uniformly described herein, and details are not described in the following embodiments.

(2) Semi-activated state: An antenna panel in the semi-activated state can be used for signal measurement, but cannot be used for data transmission. In other words, an antenna panel in the semi-activated state can transmit and measure a measurement signal, but cannot transmit data. In other words, the network device can schedule an antenna panel in the semi-activated state to perform signal measurement, but cannot schedule the antenna panel in the semi-activated state to perform data transmission.

For example, an antenna panel in this state may be used to measure a downlink reference signal and send an uplink reference signal, but the antenna panel cannot be used for data transmission.

In the embodiments, the semi-activated state may also be referred to as a measurement state, a semi-on state, a semi-power-on state, a semi-sleep state, or the like. The name of the state is not limited in the embodiments. In addition, the names can be replaced with each other.

(3) Activated state: An antenna panel in the activated state can be used for signal measurement and can be used for data transmission. In other words, an antenna panel in the activated state can transmit and measure a measurement signal, and can transmit data. In other words, the network device can schedule an antenna panel in the activated state to perform signal measurement, and can also schedule the antenna panel in the semi-activated state to perform data transmission.

For example, an antenna panel in this state may be used to measure a downlink reference signal and send an uplink reference signal, and the antenna panel may also be used for data transmission.

In the embodiments, the activated state may also be referred to as an on state, a power-on state, an awake state, or the like. The name of the state is not limited in the embodiments. In addition, the names can be replaced with each other.

(4) Ready-to-transmit state: An antenna panel in the ready-to-transmit state can be used for transmission, but transmission is not performed currently.

(5) Transmission state: An antenna panel in the transmission state can be used for transmission, and transmission is performed currently.

(6) Uplink activated state: An antenna panel in the uplink activated state can perform uplink transmission, but cannot perform downlink reception.

For example, an antenna panel in this state may be used to send an uplink reference signal and/or uplink data, but cannot receive a downlink reference signal and/or downlink data.

(7) Downlink activated state: An antenna panel in the downlink activated state can perform downlink transmission, but cannot perform uplink sending.

For example, an antenna panel in the downlink activated state may be used to receive a downlink reference signal and/or downlink data, but cannot send an uplink reference signal and/or uplink data.

(8) Uplink semi-activated state: An antenna panel in the uplink semi-activated state can perform uplink measurement, but cannot perform downlink measurement or data transmission.

For example, an antenna panel in this state may be used to send an uplink reference signal, but the antenna panel cannot be used to receive a downlink reference signal and downlink data, and the antenna panel cannot be used to send uplink data.

(9) Downlink semi-activated state: An antenna panel in the downlink semi-activated state can perform downlink measurement, but cannot perform uplink measurement or data transmission.

For example, an antenna panel in this state may be used to receive and measure a downlink reference signal, but the antenna panel cannot be used to send an uplink reference signal and uplink data, and the antenna panel cannot be used to receive downlink data.

Optionally, when both uplink transmission and downlink transmission are performed, an antenna panel used for uplink transmission and an antenna panel used for downlink transmission may be selected from antenna panels in the activated state.

Optionally, the measurement signal may include an uplink reference signal or a downlink reference signal. The uplink reference signal includes but is not limited to an SRS, a DMRS, an uplink positioning signal (RS), or the like. The downlink reference signal includes but is not limited to a CSI-RS, a CRS, a cell-specific reference signal (CS-RS), a UE-specific reference signal (US-RS), a DMRS, an SSB, or the like.

The signal measurement includes but is not limited to: radio resource management (RRM) measurement, serving cell measurement, neighboring cell measurement, intra-frequency measurement, inter-frequency measurement, channel state information (CSI) measurement, reference signal receiving power (RSRP) measurement, channel quality indicator (CQI) measurement, precoding matrix indicator (PMI) measurement, channel rank indicator (RI) measurement, signal to interference plus noise ratio (SINR) measurement, reference signal receiving quality (RSRQ) measurement, SSB measurement, CSI-RS measurement, SRS measurement, TRS measurement, uplink beam management, downlink beam management, beam failure monitoring, alternative beam measurement for beam failure, time offset/frequency offset measurement (or referred to as time-frequency synchronization), and the like.

The data transmission includes but is not limited to uplink transmission, downlink transmission, random access, PUCCH transmission, PUSCH transmission, CSI feedback, hybrid automatic repeat request (HARQ) feedback, and the like. The transmission may include sending and/or receiving.

Optionally, the plurality of states may be defined in a protocol. In other words, the terminal device may determine the K states supported by the antenna panel of the terminal device in the plurality of states defined in the protocol. For example, the K states determined by the terminal device, or in other words, a relationship between a quantity and a state, may have the following several cases.

When K is equal to 2, two states supported by the antenna panel of the terminal device may be the deactivated state and the activated state.

When K is equal to 3, three states supported by the antenna panel of the terminal device may be the deactivated state, the semi-activated state, and the activated state.

When K is equal to 3, three states supported by the antenna panel of the terminal device may be alternatively the deactivated state, the uplink activated state, and the downlink activated state.

When K is equal to 4, four states supported by the antenna panel of the terminal device may be the deactivated state, the semi-activated state, the ready-to-transmit state, and the transmission state.

When K is equal to 4, four states supported by the antenna panel of the terminal device may be alternatively the deactivated state, the uplink activated state, the downlink activated state, and the activated state.

It may be understood that the foregoing is merely an example of corresponding states when K is various values. The states are not limited. For example, when K is equal to 2, two states supported by the antenna panel of the terminal device may be alternatively the semi-activated state and the activated state.

S402: The terminal device sends first information to a network device. Correspondingly, the network device receives the first information from the terminal device.

In a possible implementation, the first information may include a value of K, and is used to notify the network device of a quantity of states supported by the antenna panel of the terminal device. Optionally, after receiving the quantity, the network device may determine, based on a relationship between a quantity and states, the states supported by the antenna panel of the terminal device. For example, the relationship between a quantity and states is as follows: When K is equal to 3, the states are the deactivated state, the semi-activated state, and the activated state. In this case, the network device may determine, based on the value 3 of K reported by the terminal device, that the states supported by the antenna panel of the terminal device are the deactivated state, the semi-activated state, and the activated state.

In another possible implementation, the first information may include identifiers or indexes of the states supported by the antenna panel of the terminal device. For example, in the foregoing nine states, identifiers of the states are shown in the following Table 1. In this case, when the K states determined by the terminal device are the deactivated state, the semi-activated state, and the activated state, the first information may include 1, 2, and 3. After receiving the identifiers of the states, the network device may determine that the states supported by the antenna panel of the terminal device are the deactivated state, the semi-activated state, and the activated state.

TABLE 1

| State | Identifier |
| --- | --- |
| Deactivated state | 1 |
| Semi-activated state | 2 |
| Activated state | 3 |
| Ready-to-transmit state | 4 |
| Transmission state | 5 |
| Uplink activated state | 6 |
| Downlink activated state | 7 |
| Uplink semi-activated state | 8 |
| Downlink semi-activated state | 9 |

In still another possible implementation, the first information may include a capability of the antenna panel of the terminal device. For example, the capability of the antenna panel includes one or more of the following: the antenna panel cannot be used for signal measurement or data transmission, the antenna panel can be used for signal measurement but cannot be used for data transmission, the antenna panel can be used for signal measurement and can be used for data transmission, the antenna panel can be used for transmission but transmission is not performed currently, the antenna panel can be used for transmission and transmission is performed currently, the antenna panel can perform uplink transmission but cannot perform downlink reception, the antenna panel can perform downlink transmission but cannot perform uplink sending, the antenna panel can perform uplink measurement but cannot perform downlink measurement or data transmission, or the antenna panel can perform downlink measurement but cannot perform uplink measurement or data transmission.

Optionally, the first information may include a bitmap (bitmap) of M bits. Each bit in the bitmap corresponds to a capability. When a value of a bit is "1", it indicates that the antenna panel of the terminal device supports a capability corresponding to the bit, or when a value of a bit is "0", it indicates that the antenna panel of the terminal device supports a capability corresponding to the bit.

For example, based on the foregoing example, if the bitmap is "111000000", it may indicate that the antenna panel of the terminal device cannot be used for signal measurement or data transmission, can be used for signal measurement but cannot be used for data transmission, or can be used for signal measurement and can be used for data transmission.

Optionally, the terminal device may send the first information to the network device by using radio resource control (RRC) signaling, a media access control control element (MAC CE), or uplink control information (UCI). Alternatively, the terminal device may send the first information to the network device by using terminal capability parameter information. In other words, the first information may be understood as partial information of the terminal capability parameter information.

It should be noted that the foregoing steps S401 and S402 are optional steps. The terminal device and the network device may not perform the foregoing steps S401 and S402. For example, the protocol specifies the K states supported by the antenna panel of the terminal device. In this case, the network device may also learn of the K states according to the protocol.

S403: The terminal device switches a state of a first antenna panel from a first state to a second state.

The first antenna panel is one or more of a plurality of antenna panels included in the terminal device. The first state and the second state are states in the foregoing K states.

In other words, the terminal device may control the state of the antenna panel, so that the antenna panel is switched between the foregoing K states.

Figure 5A:
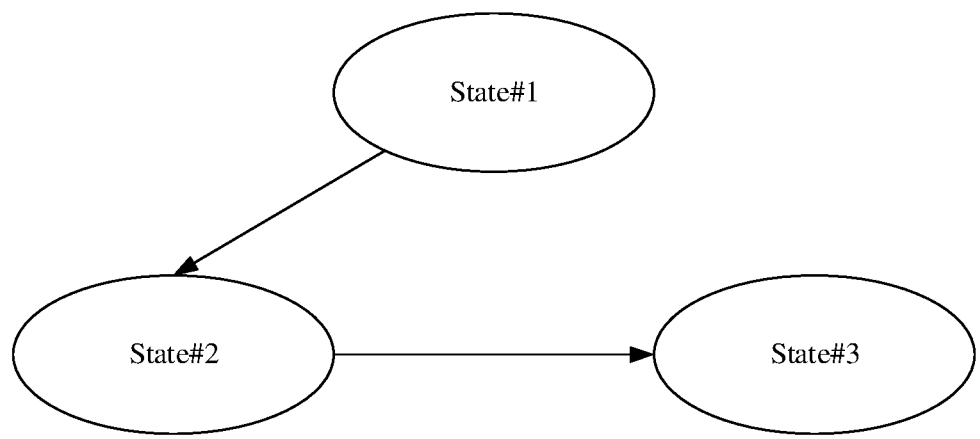
FIG. 5a is a schematic diagrams of state transition according to an embodiment.
Figure 5B:
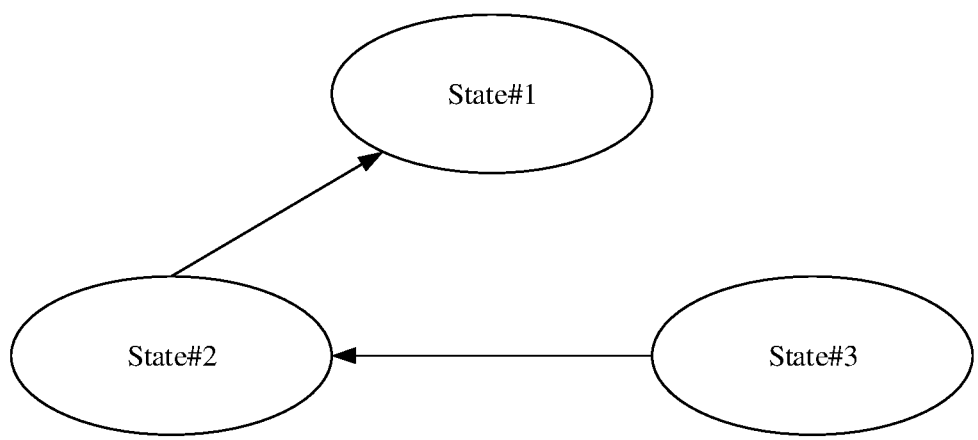
FIG. 5b is a schematic diagrams of state transition according to an embodiment.
Figure 5C:
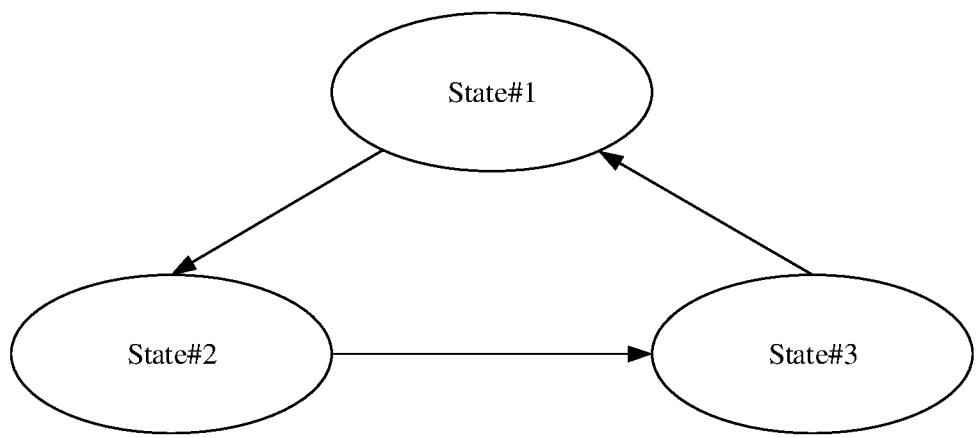
FIG. 5c is a schematic diagrams of state transition according to an embodiment.
Figure 5D:
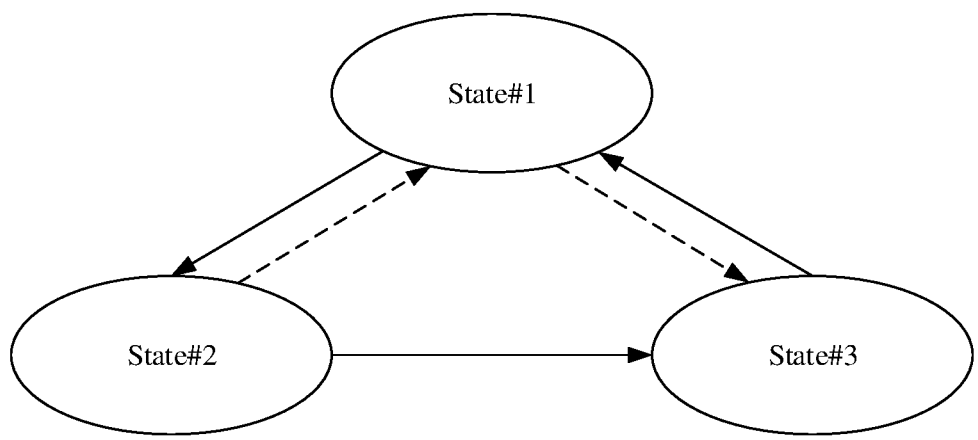
FIG. 5d is a schematic diagrams of state transition according to an embodiment.

Optionally, the K states meet a switching rule, and a switching relationship between the K states specified in the switching rule may be a sequential relationship. In the sequential relationship, switching between the K states is open-loop. For example, state #1→state #2→ . . . →state #K−1→state #K. That K is equal to 3 is used as an example, and the relationship may be shown in FIG. 5a. Alternatively, for example, state #K→state #K−1→ . . . →state #2→state #1. That K is equal to 3 is used as an example, and the relationship may be shown in FIG. 5b. Alternatively, the switching relationship between the K states specified in the switching rule may be a cyclic relationship. In the cyclic relationship, switching between the K states is closed-loop. For example, state #1→state #2→ . . . →state #K−1→state #K→state #1. That K is equal to 3 is used as an example, and the relationship may be shown in FIG. 5c. Alternatively, the switching relationship between the K states specified in the switching rule may be a combination of a sequential relationship and a cyclic relationship, for example, may be a sequential relationship (state #2→state #1→state #3) and a cyclic relationship (state #1→state #2→ . . . →state #K−1→state #K→state #1). That K is equal to 3 is used as an example, and the relationship may be shown in FIG. 5d.

Figure 6:
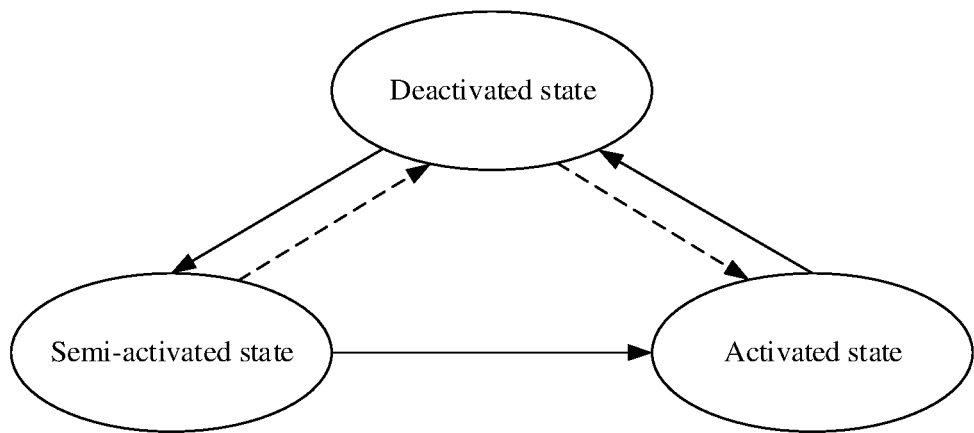
FIG. 6 is a schematic diagrams of state transition according to an embodiment.

When the foregoing K states include the deactivated state, the semi-activated state, or the activated state, the switching rule includes one or more of the following: the activated state can be switched to the deactivated state; the deactivated state can be switched to the semi-activated state; the semi-activated state can be switched to the activated state; the semi-activated state can be switched to the deactivated state; or the deactivated state can be switched to the activated state. An example is shown in FIG. 6. A switching relationship of the deactivated state→semi-activated state→activated state→deactivated state may be understood as a cyclic relationship, and a switching relationship of the semi-activated state→deactivated state→activated state may be understood as a sequential relationship.

In some implementation scenarios, it may be considered that the switching rule includes one or more of the following: the first state is the activated state, and the second state is the deactivated state; the first state is the deactivated state, and the second state is the semi-activated state; the first state is the semi-activated state, and the second state is the activated state; the first state is the semi-activated state, and the second state is the deactivated state; or the first state is the deactivated state, and the second state is the activated state.

Optionally, an antenna panel in the activated state can be used for signal measurement and data transmission. When the antenna panel cannot be used for data transmission, the antenna panel may be switched to the deactivated state according to the switching rule, that is, the antenna panel is turned off, instead of being switched to the semi-activated state to continue signal measurement, thereby reducing power consumption of the terminal device.

The switching rule may exist when the K states include the deactivated state, the semi-activated state, and the activated state. As long as two states described above belong to the K states, a switching relationship between the two states may exist. For example, if the foregoing K states include only the deactivated state and the activated state, the switching relationship between the deactivated state and the activated state still exists, that is, the activated state can be switched to the deactivated state, and/or the deactivated state can be switched to the activated state. Alternatively, if the K states include only the semi-activated state and the activated state, the switching relationship between the semi-activated state and the activated state still exists, that is, the semi-activated state can be switched to the activated state.

Optionally, the switching rule may be defined in the protocol. Alternatively, the switching rule may be determined by the terminal device. In this case, before step S403, the terminal device may send the switching rule to the network device, so that the network device may subsequently determine, based on the switching rule, a state of the antenna panel after switching. Alternatively, the switching rule may be determined by the network device. In this case, before step S403, the network device may send the switching rule to the terminal device, so that the network device switches the state of the antenna panel based on the switching rule.

Based on this solution, the plurality of states of the antenna panel such as the activated state, the semi-activated state, and the deactivated state are defined. Functions or operations that can be implemented in each state are different. Therefore, the terminal device can flexibly manage an antenna panel by controlling a panel state. In addition, in the semi-activated state, the antenna panel can be used for signal measurement, but cannot be used for data transmission. Therefore, when the antenna panel is in the semi-activated state, it can be ensured that the network device does not schedule the antenna panel to perform another operation, for example, data transmission and timing synchronization, thereby reducing energy consumption of the terminal device.

The following describes in detail manners in which the terminal device switches the state of the first antenna panel from the first state to the second state.

It should be noted that the K states may not be limited in the following manners. In other words, in any possible K states, the following manners are applicable.

Manner 1: That the terminal device switches the state of the first antenna panel from the first state to the second state may include: The terminal device switches the state of the first antenna panel from the first state to the second state when a first timer expires. The first timer is a timer activated when the first antenna panel enters the first state.

In other words, the first timer is activated (or started) when the first antenna panel enters the first state, and the state of the first antenna panel is switched from the first state to the second state when the first timer expires. Duration of the first timer may be understood as maximum duration for which the first antenna panel can be in the first state.

Optionally, the first state and the second state meet the foregoing switching rule. The terminal device may determine the second state based on the first state and the switching rule, and switch the state of the first antenna panel from the first state to the second state when the first timer expires.

In this embodiment, in the switching relationship specified in the switching rule, there may be a case in which a state may be switched to two states. For example, in the example shown in FIG. 6, the semi-activated state may be switched to the deactivated state and the activated state. In this case, the network device and the terminal device may agree on a switching relationship used for current switching. For example, when the terminal device initiates switching of the state of the antenna panel, the terminal device may indicate, to the network device, a switching relationship used for current switching. For example, switching from the semi-activated state to the deactivated state is a relationship 1, and switching from the semi-activated state to the activated state is a relationship 2. If the relationship 1 is used, the terminal device may send, to the network device, information indicating the relationship 1. When the network device initiates switching of the state of the antenna panel, the network device may indicate, to the terminal device, a switching relationship used for current switching. If the relationship 2 is used, the terminal device may send, to the network device, information indicating the relationship 2.

Optionally, the duration of the first timer may be agreed on in the protocol; or may be configured (or indicated) by the network device for the terminal device; or may be determined by the terminal device. In this case, the terminal device may further send information about the first timer to the network device, for example, the duration of the first timer.

Optionally, the terminal device may update the duration of the first timer, and send information to the network device to notify updated duration of the first timer, to synchronize the first timer of the network device and the terminal device.

In this possible manner, because the network device may learn of the information about the first timer, after the state of the first antenna panel enters the first state, the network device may also activate the first timer. When the first timer expires, the network device may determine that the state of the first antenna panel is switched, and may determine, according to the switching rule, that the switched state is the second state. Therefore, in this implementation, after switching the state of the first antenna panel from the first state to the second state, the terminal device does not need to send information to the network device to notify that the state of the first antenna panel is switched from the first state to the second state, so that the network device can learn of the state of the first antenna panel after switching, thereby reducing signaling overheads.

Optionally, the terminal device may switch the state of the first antenna panel in Manner 1 in the following two cases.

Case 1: The first state is the semi-activated state, and the second state is the deactivated state.

In other words, when the state of the first antenna panel enters the semi-activated state, the first timer may be activated; and when the first timer expires, the terminal device may switch the first antenna panel from the semi-activated state to the deactivated state.

Optionally, because the first antenna panel in the semi-activated state may be used for signal measurement, after the first timer is activated when the first antenna panel enters the semi-activated state, the terminal device may perform signal measurement on the first antenna panel before the first timer expires. The signal measurement may be performed for one or more times. For example, once a measurement result obtained through signal measurement is less than or equal to a first threshold, the terminal device may stop the measurement, and wait for the first timer to expire; or when a measurement result obtained through signal measurement is less than or equal to a first threshold, the terminal device continues to perform signal measurement on the first antenna panel until the first timer expires, or the obtained measurement result is greater than the first threshold before the first timer expires.

Optionally, in the foregoing signal measurement process, if the first timer expires, the terminal device switches the state of the first antenna panel from the semi-activated state to the deactivated state. If the obtained measurement result is greater than the first threshold before the first timer expires, the terminal device may stop the first timer, and switch the state of the first antenna panel from the semi-activated state to the activated state. In this case, the terminal device may further send information to the network device to indicate that the state of the first antenna panel is switched from the semi-activated state to the activated state, so that the network device learns of the current state of the first antenna panel and stops the first timer.

Case 2: The first state is the activated state, and the second state is the deactivated state.

In other words, when the state of the first antenna panel enters the activated state, the first timer may be activated; and when the first timer expires, the terminal device may switch the first antenna panel from the activated state to the deactivated state.

Optionally, because the first antenna panel in the activated state may be used for signal measurement, after the first timer is activated when the first antenna panel enters the activated state, the terminal device may perform signal measurement on the first antenna panel before the first timer expires. The signal measurement may be performed for one or more times. For example, once a measurement result obtained through signal measurement is less than a signal measurement result corresponding to a second antenna panel, the terminal device may stop the measurement, and stop the first timer. In addition, the terminal device may further switch the state of the first antenna panel from the activated state to the deactivated state, and transmit data by using the second antenna panel. When the measurement result obtained through signal measurement is greater than the signal measurement result corresponding to the second antenna panel, the terminal device continues to perform signal measurement on the first antenna panel until the first timer expires, and the state of the first antenna panel is switched from the activated state to the deactivated state.

It may be understood that the foregoing two cases are merely examples for describing application of Manner 1, and Manner 1 is not limited to be used only in the foregoing two cases. For example, when the first state is the deactivated state and the second state is the semi-activated state, Manner 1 may also be used to control the switching.

Manner 2: That the terminal device switches the state of the first antenna panel from the first state to the second state may include: The terminal device switches the state of the first antenna panel from the first state to the second state when a first condition is met.

Optionally, the first state and the second state meet the foregoing switching rule. The second state may be determined based on the first state and the switching rule, and the state of the first antenna panel is switched from the first state to the second state when the first condition is met.

Optionally, the first condition includes one or more of the following:

(1) The terminal device receives first indication information from the network device.

The first indication information indicates switching of the state of the first antenna panel, or the first indication information indicates switching of the state of the first antenna panel according to a switching rule.

In other words, the antenna panel management method provided in this embodiment may further include: The network device sends first indication information to the terminal device. Correspondingly, the terminal device receives the first indication information from the network device. The network device may indicate to switch the state of the first antenna panel, and after receiving the first indication information from the network device, the terminal device switches the state of the first antenna panel from the first state to the second state. In other words, once receiving the first indication information from the network device, the terminal device switches the state of the first antenna panel from the first state to the second state.

Optionally, that the network device sends first indication information to the terminal device may include: The network device sends the first indication information to the terminal device by using RRC signaling, a MAC CE, a PDCCH, or a PDSCH.

Optionally, the first indication information may include an identifier of the first antenna panel. Because the first state and the second state meet the switching rule, after receiving the identifier of the first antenna panel, the terminal device may determine the first state of the first antenna panel before switching, determine the second state based on the switching rule and the first state, and then switch the state of the first antenna panel from the first state to the second state.

In another implementation scenario, the first indication information may indicate the terminal device to turn on a plurality of antenna panels. If a quantity of antenna panels currently turned on by the terminal device is less than a quantity indicated by the network device, the terminal device may further turn on one or more antenna panels based on the first indication information, to meet the quantity indicated by the network device. An antenna panel turned on by the terminal device based on the first indication information may be understood as a first antenna panel.

It should be noted that, in this embodiment, turning on an antenna panel may be understood as setting a state of the antenna panel to the activated state or the semi-activated state, or switching the state of the antenna panel to the activated state or the semi-activated state.

(2) First time arrives.

The first time is time at which first duration has elapsed since receiving of the first indication information by the terminal device. For example, if a moment at which the terminal device receives the first indication information is a moment A, and the first duration is 10 milliseconds (ms), the first time is time at which 10 ms has elapsed since the moment A, that is, A+10 ms.

Alternatively, condition (2) may be understood as follows: The first indication information from the network device is received, and first duration has elapsed since receiving of the first indication information.

Optionally, the first duration may be specified in the protocol, or may be configured by the network device, or may be determined by the terminal device. In this case, the terminal device may further send information about the first duration to the network device, so that the network device learns of a state switching time of the antenna panel.

(3) Second time arrives.

The second time is time at which second duration has elapsed since sending of first acknowledgement (acknowledgement, ACK) information to the network device by the terminal device. The first ACK information is ACK information of the first indication information. The first ACK information indicates that the terminal device receives the first indication information, and/or that the terminal device is to switch the state of the first antenna panel based on an indication of the first indication information.

Alternatively, condition (3) may be understood as follows: After the first indication information from the network device is received, the first ACK information is sent to the network device, and second duration has elapsed since sending of the first ACK information.

In other words, after the terminal device receives the first indication information from the network device, the antenna panel management method provided in this embodiment may further include: The terminal device sends first ACK information to the network device. Correspondingly, the network device receives the first ACK information from the terminal device.

For example, a moment at which the terminal device receives the first indication information is a moment A, a moment at which the first ACK information is sent to the network device is a moment B, and the second duration is 5 ms. In this case, the second time is time at which 5 ms has elapsed since the moment B, that is, B+5 ms.

Optionally, the second duration may be specified in the protocol, or may be configured by the network device, or may be determined by the terminal device. In this case, the terminal device may further send information about the second duration to the network device, so that the network device learns of a state switching time of the antenna panel.

Alternatively, the second time may be time at which the terminal device sends the first ACK information to the network device. Once the terminal device sends the first ACK information to the network device, the state of the first antenna panel is switched from the first state to the second state. In this case, condition (3) may also be understood as follows: The first indication information from the network device is received, and the first ACK information is sent to the network device.

(4) Third time arrives.

The third time is time indicated in the first indication information.

Alternatively, condition (4) may be understood as follows: The first indication information from the network device is received, the first indication information indicates a first switching time, and the first switching time arrives.

In other words, in addition to the identifier of the first antenna panel, the first indication information may further include information indicating the third time. After receiving the first indication information, the terminal device may switch the state of the first antenna panel from the first state to the second state at the third time based on the first indication information.

Optionally, in the foregoing four conditions, because the network device instructs the terminal device to perform state switching, after completing the switching, the terminal device may not send, to the network device, information indicating that the state of the first antenna panel is switched.

(5) The terminal device sends second indication information to the network device.

The second indication information indicates that the terminal device switches the state of the first antenna panel, or in other words, the second indication information indicates that the terminal device is to switch the state of the first antenna panel according to a switching rule.

In other words, the antenna panel management method provided in this embodiment may further include: The terminal device sends second indication information to the network device, and correspondingly, the network device receives the second indication information from the terminal device. After sending the second indication information to the network device, the terminal device switches the state of the first antenna panel from the first state to the second state. In other words, once sending the second indication information to the network device, the terminal device switches the state of the first antenna panel from the first state to the second state.

Optionally, that the terminal device sends second indication information to the network device may include: The terminal device sends the second indication information to the network device by using a PUCCH, a PUSCH, a MAC CE, or RRC signaling.

Optionally, the terminal device may send the second indication information to the network device when determining to switch the state of the first antenna panel. For example, if the first state is the semi-activated state, the terminal device may determine, when obtaining, through measurement, that the quality of the first antenna panel is relatively good, to switch the state of the first antenna panel, and send the second indication information to the network device. Further, the terminal device may alternatively determine to switch the state of the first antenna panel in another case. Implementation of determining, by the terminal device, to switch the state of the first antenna panel is not limited in embodiments.

Optionally, the second indication information may include the identifier of the first antenna panel. Because the first state and the second state meet the switching rule, after receiving the identifier of the first antenna panel, the network device may determine the second state after switching based on the first state of the first antenna panel before switching and the switching rule.

Alternatively, the second indication information may include the identifier of the first antenna panel and information indicating the first state. After receiving the second indication information, the network device may determine, based on the first state and the switching rule, the second state after switching.

(6) The terminal device may send second indication information to the network device and may receive second ACK information from the network device.

The second ACK information is ACK information of the second indication information. The second ACK information indicates that the network device receives the second indication information, and/or indicates that the network device allows the terminal device to switch the state of the first antenna panel.

In other words, after the network device receives the second indication information from the terminal device, the antenna panel management method provided in this embodiment may further include: The network device sends second ACK information to the terminal device. Correspondingly, the terminal device receives the second ACK information from the network device, and switches the state of the first antenna panel from the first state to the second state after receiving the second ACK information. In other words, once receiving the second ACK information from the network device, the terminal device switches the state of the first antenna panel from the first state to the second state.

(7) Fourth time arrives.

The fourth time is time at which third duration has elapsed since sending of the second indication information to the network device by the terminal device. For example, if a moment at which the terminal device sends the second indication information to the network device is a moment C, and the third duration is 20 ms, the fourth time is time at which 20 ms has elapsed since the moment C, that is, C+20 ms.

Alternatively, condition (7) may be understood as follows: The second indication information is sent to the network device, and third duration has elapsed since sending of the second indication information.

Optionally, the third duration may be specified in the protocol, or may be configured by the network device, or may be determined by the terminal device. In this case, the terminal device may further send information about the third duration to the network device, so that the network device learns of a state switching time of the antenna panel.

(8) Fifth time arrives.

The fifth time is time at which fourth duration has elapsed since receiving of the second ACK information from the network device by the terminal device.

Alternatively, condition (8) may be understood as follows: The second ACK information from the network device is received after the second indication information is sent to the network device, and fourth duration has elapsed since receiving of the second ACK information.

For example, a moment at which the terminal device sends the second indication information to the network device is a moment C, a moment at which the second ACK information is received from the network device is a moment D, and the fourth duration is 15 ms. In this case, the fifth time is time at which 15 ms has elapsed since the moment D, that is, D+15 ms.

Optionally, the fourth duration may be specified in the protocol, or may be configured by the network device, or may be determined by the terminal device. In this case, the terminal device may further send information about the fourth duration to the network device, so that the network device learns of a state switching time of the antenna panel.

(9) Sixth time arrives.

The sixth time is time indicated in the second indication information.

Alternatively, condition (9) may be understood as follows: The second indication information is sent to the network device, the second indication information indicates a second switching time, and the second switching time arrives.

In other words, in addition to the identifier of the first antenna panel, the second indication information may further include information indicating the sixth time. The terminal device may switch the state of the first antenna panel from the first state to the second state at the sixth time. After receiving the second indication information, the network device may determine, based on the second indication information, that the state of the first antenna panel is switched at the sixth time, and the state after the switching is the second state.

Optionally, in the foregoing condition (5) to condition (9), before switching the state of the first antenna panel, the terminal device may send the second indication information to the network device, to indicate that the terminal device is to switch the state of the first antenna panel. Therefore, after completing the switching, the terminal device may not send, to the network device, information indicating that the state of the first antenna panel is switched.

(10) A second timer expires.

Optionally, the second timer may be a timer activated when the first antenna panel enters the first state. In other words, the second timer is activated when the first antenna panel enters the first state, and the state of the first antenna panel is switched from the first state to the second state when the second timer expires. Duration of the second timer may be understood as maximum duration for which the first antenna panel can be in the first state. For details, refer to related descriptions of the first timer, and details are not described herein again.

Optionally, the duration of the second timer may be the same as or different from the duration of the first timer. This is not limited in embodiments. For example, when the first state is the semi-activated state and the second state is the deactivated state, switching is performed based on the first timer, where the duration of the first timer is duration 1; or when the first state is the deactivated state and the second state is the activated state, switching is performed based on the second timer, where the duration of the second timer is duration 2. The duration 1 and the duration 2 may be the same or may be different. In other words, maximum duration for which the antenna panel is in different states may be the same or may be different.

(11) A switching periodicity of the state arrives.

Optionally, the terminal device may periodically monitor the state of the first antenna panel based on the switching periodicity and may switch the state of the first antenna panel from the first state to the second state when detecting that the state of the first antenna panel is the first state.

For example, when a first switching periodicity arrives, the terminal device monitors the state of the first antenna panel, and switches the state of the first antenna panel from the first state to the second state if the state is the first state. When a second switching periodicity arrives, if the state of the first antenna panel is still the first state, the state of the first antenna panel is switched from the first state to the second state again. The rest can be deduced by analogy.

Optionally, a reason why the state of the first antenna panel is switched from the first state to the second state in the previous periodicity and it is detected in the subsequent periodicity that the state of the first antenna panel is still the first state may be that after the state of the first antenna panel is switched from the first state to the second state in the previous periodicity, the state of the first antenna panel is finally switched back to the first state after state switching.

Optionally, the switching periodicity may be greater than or equal to a time required for completing one signal measurement.

Optionally, the switching periodicity may be specified in the protocol, or may be configured by the network device, or may be determined by the terminal device. In this case, the terminal device may further send information about the switching periodicity to the network device.

For example, the first state is the deactivated state, the second state is the semi-activated state, the switching periodicity is 10 minutes, and signal measurement can be completed within 10 minutes. If an initial state of the first antenna panel is the deactivated state, the terminal device switches the state of the first antenna panel from the deactivated state to the semi-activated state at the $0^{th}$ minute. Before the $10^{th}$ minute, the terminal device performs signal measurement in the semi-activated state. If a measurement result obtained through signal measurement does not meet a quality requirement, the state of the first antenna panel is switched from the semi-activated state back to the deactivated state. At the 10$^{th}$ minute, if the state of the first antenna panel is still the deactivated state, the terminal device switches the state of the first antenna panel from the deactivated state to the semi-activated state again, performs signal measurement in the semi-activated state, and so on.

In the foregoing example, if the measurement result obtained through signal measurement meets the quality requirement, the terminal device may switch the state of the first antenna panel from the semi-activated state to the activated state.

By using the method, the terminal device can periodically switch the antenna panel in the deactivated state to the semi-activated state for signal measurement, and switch the antenna panel to the activated state or the deactivated state based on the measurement result, that is, determine whether to use the antenna panel for transmission or continue to turn off the antenna panel. Because the antenna panel in the semi-activated state can be used for measurement and cannot be used for data transmission, it can be ensured that the network device does not schedule the antenna panel to perform data transmission, timing synchronization, or the like, thereby avoiding unnecessary power consumption.

Optionally, in this implementation, after switching the state of the first antenna panel, the terminal device may send a message to the network device, to notify that the state of the first antenna panel is switched.

Optionally, the terminal device may switch the state of the first antenna panel in Manner 2 in one or more of the following cases:

the first state is the deactivated state, and the second state is the semi-activated state; or the first state is the semi-activated state, and the second state is the activated state; or the first state is the activated state, and the second state is the deactivated state; or the first state is the deactivated state, and the second state is the activated state; or the first state is the semi-activated state, and the second state is the deactivated state; or the first state is the activated state, and the second state is the semi-activated state.

It may be understood that, that the first timer expires in Manner 1 may be considered as one of the first conditions, that is, the first condition includes that the first timer expires. In this case, Manner 1 may be considered as an implementation of Manner 2.

Manner 3: When determining to switch the state of the first antenna panel, the terminal device switches the state of the first antenna panel from the first state to the second state.

Implementation of determining, by the terminal device, to switch the state of the first antenna panel is not limited in embodiments. For example, if the first state is the semi-activated state, the terminal device may determine to switch the state of the first antenna panel when determining that the quality of the first antenna panel is relatively good.

Optionally, the first state and the second state meet the foregoing switching rule, that is, the second state may be determined based on the first state and the switching rule. When determining to switch the state of the first antenna panel, the terminal device switches the state of the first antenna panel from the first state to the second state.

Optionally, in this manner, after switching the state of the first antenna panel from the first state to the second state, the terminal device may send third indication information to the network device. Correspondingly, the network device receives the third indication information from the terminal device. The third indication information indicates that the state of the first antenna panel is switched according to the switching rule. The third indication information may be the identifier of the first antenna panel.

Optionally, the third indication information does not indicate the state of the first antenna panel after switching.

Optionally, after receiving the third indication information, the network device may determine the state (namely, the second state) after switching based on the switching rule and the state (namely, the first state) of the first antenna panel before switching.

Optionally, the state of the first antenna panel before switching may be recorded by the network device, or may be reported by the terminal device. In other words, in addition to the identifier of the first antenna panel, the terminal device may further send, to the network device, the information indicating the first state, to indicate, to the network device, the state of the first antenna panel before switching.

The switching rule in this manner may be any one or more switching rules described above. For example, a cyclic switching rule is as follows: deactivated state→semi-activated state→activated state→deactivated state; or deactivated state→activated state→deactivated state.

It may be understood that, in actual application, the terminal device may switch the state of the antenna panel in any one of the foregoing three manners, or may switch the state of the antenna panel in a combination of a plurality of foregoing three manners.

Optionally, the foregoing three manners may be understood as that the terminal device switches the state of the first antenna panel from the first state to the second state based on a state switching policy, or may be understood as that the terminal device manages the state of the first antenna panel based on a state switching policy.

Further, the state switching policy may be classified into a conditional switching policy and a non-conditional switching policy. The first timer in Manner 1 and the first condition in Manner 2 may be understood as a state switching condition of the conditional switching policy. The policy corresponding to Manner 3 may be understood as a non-conditional switching policy, that is, the terminal device determines state switching of the antenna panel.

The following describes the foregoing manner by using an example.

For example, the antenna panel supports the deactivated state, the semi-activated state, and the activated state, and the terminal device manages an antenna panel 1. It is assumed that an initial state of the antenna panel 1 is the deactivated state, or in other words, state switching starts from the deactivated state.

Figure 7:
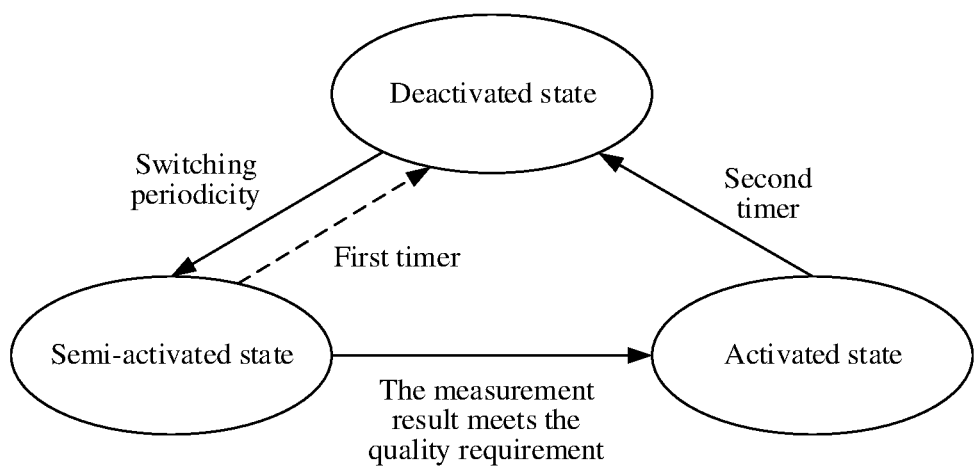
FIG. 7 is a schematic diagrams of state transition according to an embodiment.

As shown in FIG. 7, during switching from the deactivated state to the semi-activated state, the switching periodicity in Manner 2 may be used for control. For example, when the switching periodicity arrives, the terminal device switches the antenna panel 1 from the deactivated state to the semi-activated state, activates a timer 1 when the antenna panel 1 enters the semi-activated state, and then performs signal measurement in the semi-activated state. The timer 1 is a first timer. In addition, the terminal device sends a message to the network device, to notify the network device that the state of the antenna panel 1 is switched.

If a measurement result obtained through signal measurement does not meet the quality requirement, and the timer 1 expires, the terminal device switches the state of the antenna panel 1 from the semi-activated state back to the deactivated state. In other words, switching from the semi-activated state to the deactivated state may be controlled by using the first timer in Manner 1.

If the measurement result obtained through signal measurement meets the quality requirement, the terminal device switches the state of the antenna panel 1 from the semi-activated state to the activated state, and stops the timer 1. In other words, switching from the semi-activated state to the activated state may be controlled in Manner 3. When the terminal device determines to switch the state of the antenna panel, switching is performed. In addition, the terminal device sends a message to the network device, to notify the network device that the state of the antenna panel 1 is switched.

After the state of the antenna panel 1 is switched to the activated state, the terminal device may activate a timer 2, and switch the state of the antenna panel 1 from the activated state to the deactivated state when the timer 2 expires. Alternatively, when quality of an antenna panel 2 is greater than quality of the antenna panel 1, the state of the antenna panel 1 is switched from the activated state to the deactivated state, the antenna panel 2 is used for transmission, and the timer 2 is stopped. The timer 2 is a second timer, and duration of the timer 1 and duration of the timer 2 may be the same or different. In other words, switching from the activated state to the deactivated state may be controlled by using the second timer in Manner 1.

Based on the foregoing example, the terminal device can periodically switch the antenna panel in the deactivated state to the semi-activated state for signal measurement, and switch the antenna panel to the activated state or the deactivated state based on the measurement result, that is, determine whether to use the antenna panel for transmission or continue to turn off the antenna panel. Because the antenna panel in the semi-activated state can be used for measurement and cannot be used for data transmission, it can be ensured that the network device does not schedule the antenna panel to perform data transmission, timing synchronization, or the like, thereby avoiding unnecessary power consumption.

In addition, an embodiment may further provide an antenna panel management method.

Figure 8:
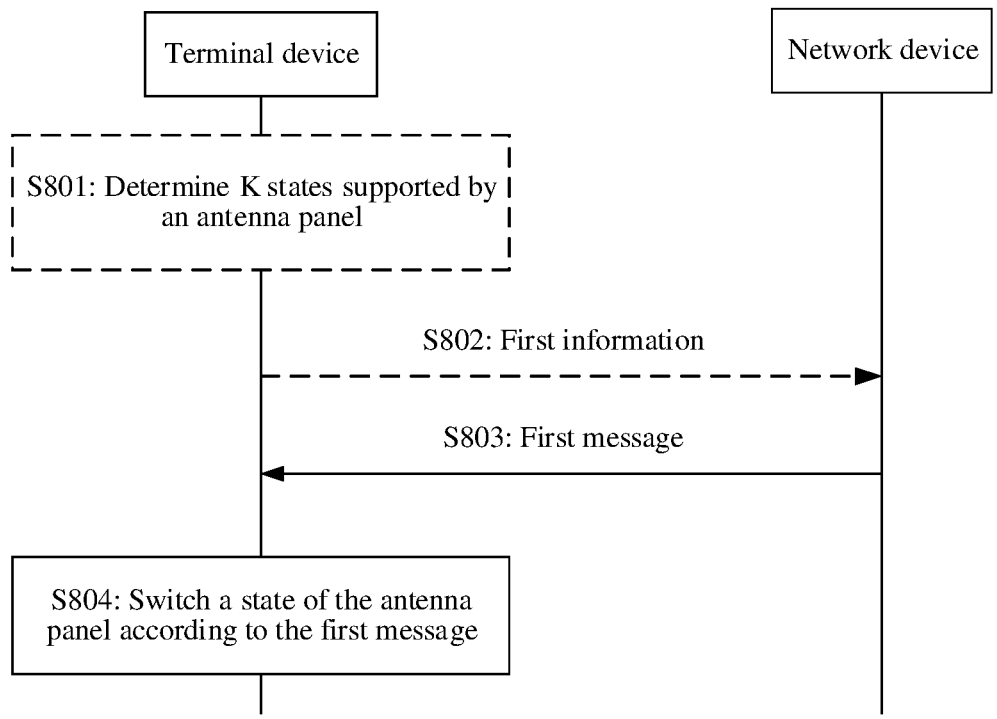
FIG. 8 is a schematic flowchart of another antenna panel management method according to an embodiment.

As shown in FIG. 8, the antenna panel management method includes the following steps.

S801 and S802 are the same as the foregoing steps S401 and S402. Refer to the foregoing related descriptions. Details are not described herein again.

S803: The network device sends a first message to the terminal device. Correspondingly, the terminal device receives the first message from the network device.

The first message indicates states of one or more antenna panels. The state may be a current state of an antenna panel determined by the network device, or may be a state that is indicated by the network device and to which the antenna panel is to be switched, that is, the network device instructs the terminal device to switch the state of the antenna panel to the state indicated by the first message.

Optionally, after receiving the first information sent by the terminal device, the network device may determine states supported by the antenna panel of the terminal device, and then may send the first message to the terminal device, to indicate states of one or more antenna panels.

Optionally, after receiving the first message, if a current state of an antenna panel is the same as the state that is of the antenna panel and that is indicated by the first message, the terminal device does not switch the state of the antenna panel; or if a current state of an antenna panel is different from the state that is of the antenna panel and that is indicated by the first message, the terminal device switches the state of the antenna panel to the state that is of the antenna panel and that is indicated by the first message.

Optionally, the first message may be an RRC message, a message carried by a MAC CE, a message carried by a PDCCH, a message carried by a PDSCH, or the like. The type of the first message is not limited in the embodiments.

Optionally, in different implementation scenarios of this embodiment, the first message includes different information. An example is provided below.

In a possible implementation, the first message includes identifiers of one or more antenna panels and a state of each of the one or more antenna panels.

For example, the first message includes identifiers of three antenna panels and a state of each antenna panel. Information included in the first message may be shown in Table 2.

TABLE 2

| Identifier of an antenna panel | State of an antenna panel |
| --- | --- |
| Antenna panel #1 | Activated state |
| Antenna panel #2 | Deactivated state |
| Antenna panel #3 | Deactivated state |

It can be understood from the information shown in Table 2 that the network device indicates that a state of the antenna panel #1 is the activated state, and states of the antenna panel #2 and the antenna panel #3 are the deactivated state. After receiving the first message, the terminal device does not switch the state of the antenna panel #1 if the state of the antenna panel #1 is the activated state or may switch the state of the antenna panel #1 to the activated state if the state of the antenna panel #1 is not the activated state. Similarly, processing performed by the terminal device on the antenna panel #2 and the antenna panel #3 is similar, and details are not described herein again.

In another possible implementation, the first message may include one or more states, and an identifier of an antenna panel corresponding to each of the one or more states.

For example, the first message includes two states and an identifier of an antenna panel corresponding to each state. Information included in the first message may be shown in Table 3.

TABLE 3

| State of an antenna panel | Identifier of an antenna panel in this state after switching |
| --- | --- |
| Activated state | Antenna panel #1 |
| Deactivated state | Antenna panel #2 and antenna panel #3 |

It can be understood from the information shown in Table 3 that the network device indicates that a state of the antenna panel #1 is the activated state, and states of the antenna panel #2 and the antenna panel #3 are the deactivated state. Processing performed after the terminal device receives the first message is similar to processing corresponding to Table 1, and details are not described herein again.

In still another possible implementation, the first message may include one or more states, and an identifier of a newly added antenna panel corresponding to each of the one or more states.

For example, the first message includes the activated state, and an identifier of an antenna panel corresponding to the activated state indicates a newly added antenna panel in the activated state. For example, before the first message is sent, the antenna panel in the activated state is the antenna panel #1. If the first message includes the activated state, an identifier of the antenna panel in the activated state is the antenna panel #2, indicating that the antenna panel #2 is a newly added antenna panel in the activated state. After receiving the first message, if the antenna panel #2 is not in the activated state, the terminal device switches the state of the antenna panel #2 to the activated state.

In yet another possible implementation, the first message may include identifiers of one or more antenna panels and may not include states corresponding to the identifiers of the one or more antenna panels.

Optionally, in this possible implementation, a state of the one or more antenna panels may be a default state in the protocol, for example, the activated state. Therefore, it may be considered that the state corresponding to the identifiers of the one or more antenna panels that is indicated by the network device is the default state in the protocol.

Optionally, the default state in the protocol may be one of the foregoing K states.

In yet another possible implementation, the first message may include a plurality of states, and does not include an identifier of an antenna panel corresponding to each of the plurality of states. A quantity of the plurality of states is the same as the quantity of antenna panels of the terminal device.

Optionally, in this possible implementation, the plurality of states may be sorted in an order, each state corresponds to one antenna panel, and the state corresponding to the antenna panel is a state that is of the antenna panel and that is indicated by the network device. For example, sorting is performed based on identifiers of antenna panels. A first state corresponds to an antenna panel #1, a second state corresponds to an antenna panel #2, and so on.

For example, the terminal device includes three antenna panels. Information included in the first message may be shown in Table 4.

TABLE 4

| State of an antenna panel |
| --- |
| Activated state |
| Deactivated state |
| Deactivated state |

If the states included in the first message are sorted based on the identifiers of the antenna panels, the first message indicates that a state of the antenna panel #1 is the activated state, and states of the antenna panel #2 and the antenna panel #3 are the deactivated state.

S804: The terminal device switches a state of the antenna panel based on the first message.

For related processing of the terminal device, refer to related descriptions in step S803. Details are not described herein again.

It may be understood that when the state of the antenna panel indicated by the first message is different from the state of the antenna panel determined by the terminal device after receiving the first message, the terminal device performs step S804.

Based on this solution, the network device can indicate the terminal device to switch the state of the antenna panel, to manage states of a plurality of antenna panels of the terminal device.

In an implementation scenario of this embodiment, the method may further include: The terminal device sends a second message to the network device. Correspondingly, the network device receives the second message from the terminal device. The second message indicates current states of one or more antenna panels.

Optionally, after receiving the second message, the network device may learn of the current state of the one or more antenna panels, to schedule, based on the state, the one or more antenna panels to perform different operations, for example, data transmission or signal measurement.

Optionally, the second message may be an RRC message, a message carried by a MAC CE, a message carried by a PUCCH, a message carried by a PUSCH, or the like. The type of the second message is not limited in the embodiments.

Optionally, information included in the second message is similar to the information included in the first message in step S802, and a difference lies in that a state included in the second message is a current state of the antenna panel. For details, refer to the foregoing related descriptions. Details are not described herein again.

Optionally, the terminal device may send the second message to the network device after a state of an antenna panel is switched, or may periodically send the second message to the network device. A condition for triggering the terminal device to send the second message is not limited in the embodiments.

Based on this solution, the network device can obtain a current state of the antenna panel, to schedule, based on different states of the antenna panel, the antenna panel to perform different operations.

In addition, for signal measurement, SRS transmission, and processing performed after the antenna panel is switched to the deactivated state, this embodiment may further provide related solutions.

For Signal Measurement:

In a possible implementation, the terminal device may actively request to perform signal measurement. The terminal device may send second information to the network device, where the second information includes one or more of the following: an identifier of the first antenna panel, a quantity of antenna panels in the activated state in the plurality of antenna panels of the terminal device, a quantity of antenna panels in the semi-activated state in the plurality of antenna panels of the terminal device, reporting configuration information, resource configuration information, resource set information, resource information, a resource type, a reporting amount, a reporting time domain type, a reporting frequency domain granularity, a group reporting indication, a repetition parameter indication, quasi co-location QCL information, transmission configuration index state TCI-state information, indication information, time information, or purpose information.

The following describes the foregoing parameters.

The identifier of the first antenna panel indicates an antenna panel that requests to perform signal measurement.

The reporting configuration information may include an index of a reporting configuration, indicating that the terminal device requests to report a measurement result by using the reporting configuration indicated by the index of the reporting configuration. The reporting configuration information may further include a periodicity of a reporting configuration.

The resource configuration information may include an index of a resource configuration, indicating that the terminal device requests to use a resource configuration indicated by the index of the resource configuration for measurement. The resource configuration information may further include a quantity of resource configurations, a maximum quantity of resource configurations, a minimum quantity of resource configurations, a periodicity of a resource configuration, or the like.

The resource set information may include an index of a resource set requested by the terminal device, indicating that the terminal device requests to use the resource set to perform signal measurement, or in other words, indicating that the terminal device requests to measure a resource included in the resource set. The resource set information may further include a quantity of resource sets requested by the terminal device, a maximum quantity of resource sets, a minimum quantity of resource sets, a periodicity of a resource set, or the like.

The resource information may include an index of a resource, and the resource information may further include a periodicity of a resource, and the like.

The resource type indicates a resource type. The type may be, for example, periodic, semi-persistent (Semi-persistent, SP), or aperiodic.

The reporting time domain type indicates a reporting time domain characteristic expected by the terminal device, which, for example, may be periodic reporting, semi-persistent (Semi-persistent, SP) reporting, or aperiodic reporting.

The reporting amount indicates a type of a measurement amount that the terminal device expects to report. The reporting amount may include, for example, but is not limited to, an RSRP, RSRQ, CQI, PMI, RI, and an SINR.

The reporting frequency domain granularity information indicates a frequency domain granularity for reporting of the measurement result, for example, may be subband reporting or full-band reporting.

The group reporting indication may be a value of a groupBasedBeamReporting parameter, and indicates whether group reporting is used.

The repetition parameter indication may be a value of a repetition parameter, and indicates whether measurement is performed according to a repetition criterion.

The indication information indicates that a newly added antenna panel enters the activated state or the semi-activated state.

The time information indicates maximum duration for which the first antenna panel is in the activated state or the semi-activated state. The first antenna panel is to be switched to the deactivated state after the duration.

The purpose information indicates a purpose of this measurement. For example, this measurement is for measurement of a newly turned-on antenna panel.

Optionally, there may be the following two cases of processing performed by the network device after receiving the second information.

Case 1: After receiving the second information, the network device may send a downlink reference signal resource based on a parameter indicated by the second information.

The downlink reference signal resource may be understood as a resource used to carry a downlink reference signal.

For example, when the second information includes the identifier of the first antenna panel, the network device sends, to the terminal device, a reference signal resource associated with the first antenna panel, and the terminal device performs measurement by using the first antenna panel.

Alternatively, when the second information includes an index of a reporting configuration/resource configuration/resource set/resource, it indicates that the reporting configuration/resource configuration/resource set/resource is triggered or activated, and the network device sends, based on the reporting configuration/resource configuration/resource set/resource, a corresponding downlink reference signal resource to the terminal device for measurement. Further optionally, in this example, the network device may send the downlink reference signal resource after a time interval has elapsed since receiving of the second information. The time interval may be sent by the terminal device to the network device. For example, the time interval is carried in the second information, or the time interval may be sent in other information. This is not limited. Alternatively, the time interval may be configured by the network device. Alternatively, the time interval may be a specified value. For example, it is specified that the time interval is one slot or 1 ms, indicating that the network device sends the downlink reference signal resource in a next slot or next millisecond after receiving the second information; or it is specified that the time interval is three slots or 3 ms, indicating that the network device sends the downlink reference signal resource in the third slot or 3 ms after receiving the second information.

Optionally, there may also be a time interval between time at which the network device sends the downlink reference signal resource and time at which the measurement result is reported. After the network device sends the downlink reference signal resource, the terminal device feeds back a measurement result of the downlink reference signal resource after the time interval. The time interval may be determined by the terminal device, may be configured by the network device, or may be a specified value. This is not limited in the embodiments.

Case 2: After receiving the second information, the network device performs downlink measurement configuration based on the parameter indicated in the second information, to configure the terminal device to perform corresponding downlink measurement.

Optionally, the downlink measurement configuration may use the parameter indicated in the second information. For example, when the second information indicates the identifier of the first antenna panel, the downlink measurement configuration is used to configure a downlink reference signal resource corresponding to the first antenna panel. Alternatively, the second information indicates a quantity of antenna panels (for example, a quantity of antenna panels in the activated state or the semi-activated state), a quantity of resource sets configured in the downlink measurement configuration is the same as the quantity of the antenna panels, and each resource set corresponds to one antenna panel. Alternatively, when the second information indicates a reporting amount, a reporting amount is configured as the reporting amount indicated by the second information in the downlink measurement configuration. Alternatively, when the second information indicates a value of a repetition (repetition) parameter, a value of a repetition parameter in the downlink measurement configuration is the value of the repetition parameter indicated in the second information.

Alternatively, for example, when the second information indicates QCL information of a resource, QCL information of a downlink reference signal resource in the downlink measurement configuration is configured as the QCL information indicated by the second information, and the network device sends the downlink reference signal resource based on the QCL information. Alternatively, when the second information indicates QCL information of a resource, QCL information of a downlink reference signal resource does not need to be configured in the downlink measurement configuration, and the network device sends the downlink reference signal resource based on the QCL information.

Optionally, the downlink measurement configuration may not use the parameter indicated in the second information. For example, when the second information indicates QCL information of a resource, QCL information configured in the downlink measurement configuration may be different from the QCL information indicated by the second information. In this case, the terminal device receives the downlink reference signal resource based on the QCL information configured in the downlink measurement configuration, or the terminal device receives the downlink reference signal resource based on the QCL information indicated in the second information.

Optionally, the network device may perform downlink measurement configuration with reference to a plurality of parameters in the second information. For example, when the second information indicates that a value of a repetition parameter is on, and the second information indicates QCL information, the network device may configure the terminal device to receive a group of downlink reference signal resources by using the QCL information, to perform downlink measurement. In other words, the network device may send a group of downlink reference signal resources by using the QCL information.

Optionally, the terminal device may send the second information to the network device after the state of the first antenna panel is switched to the activated state or the semi-activated state.

In another possible implementation, the network device may activate (or trigger) a semi-persistent or aperiodic reporting configuration and/or a resource configuration for signal measurement of the first antenna panel by using a MAC CE or DCI signaling.

Optionally, the MAC CE or the DCI signaling may include the identifier of the first antenna panel, indicating that the reporting configuration and/or the resource configuration are/is used for signal measurement of the first antenna panel.

Optionally, the network device may send the MAC CE or the DCI signaling after determining that the first antenna panel is switched to the activated state or the semi-activated state.

In still another possible implementation, each antenna panel of the terminal device is associated with one configuration, and the configuration is used for signal measurement of the antenna panel associated with the configuration. The configuration may include one or more of a reporting configuration, a resource configuration, a resource set, or a resource. The resource set/resource may correspond to a downlink reference signal resource such as an SSB or a CSI-RS, or may correspond to an uplink reference signal resource such as an SRS resource.

The uplink reference signal resource may be understood as a resource used to carry an uplink reference signal.

For example, the first antenna panel is associated with a first configuration. When the first antenna panel associated with the first configuration is switched to the activated state or the semi-activated state, the first configuration is also correspondingly automatically activated without being activated by using signaling. For example, when the network device instructs the terminal device to switch the state of the first antenna panel to the activated state or the semi-activated state, the first configuration is activated; or when the terminal device reports that the state of the first antenna panel is switched to the activated state or the semi-activated state, the first configuration is activated; or when the terminal device reports that the state of the first antenna panel is switched to the activated state or the semi-activated state and receives acknowledgment feedback from the network device, the first configuration is activated. The first configuration includes but is not limited to a reporting configuration, a resource configuration, a resource set, or a resource.

When the first antenna panel associated with the first configuration is switched to the deactivated state, the first configuration is correspondingly automatically deactivated. For example, when the network device instructs the terminal device to switch the state of the first antenna panel to the deactivated state, the first configuration is deactivated; or when the terminal device reports that the state of the first antenna panel is switched to the deactivated state, the first configuration is deactivated; or when the terminal device reports that the state of the first antenna panel is switched to the deactivated state and receives acknowledgment feedback from the network device, the first configuration is deactivated.

Based on this solution, because each antenna panel is associated with a configuration used for signal measurement, when the antenna panel is switched to the activated state or the semi-activated state, the associated configuration is activated, and when the antenna panel is switched to the deactivated state, the associated configuration is deactivated. Therefore, the related configuration does not need to be activated or deactivated by using signaling, thereby reducing signaling overheads.

Optionally, during downlink measurement, the network device may further indicate a quantity of antenna panels used by the terminal device to perform joint measurement. For example, the network device may indicate a value, representing a quantity of antenna panels used for joint measurement. Alternatively, the network device may indicate a parameter. The parameter may indicate that single-panel measurement or multi-panel measurement is used. Based on a value of the parameter, the terminal device may determine whether to use a plurality of panels for measurement. The parameter may be carried in a group reporting parameter (groupBasedBeamReporting) and may indicate whether measurement is performed by using a single antenna panel or a plurality of antenna panels in current group reporting measurement.

It should be noted that the foregoing solution related to signal measurement may be performed in combination with the solution shown in FIG. 4 or FIG. 8 in the embodiments. The solution related to signal measurement may alternatively be separately performed.

For SRS Transmission:

In a possible implementation, the network device may configure one or more SRS resource sets for the terminal device. A quantity of the plurality of SRS resource sets is the same as a quantity of antenna panels of the terminal device. Different SRS resource sets include different quantities of SRS resources, which are used by different quantities of antenna panels to transmit SRSs.

Optionally, the terminal device may determine one or more SRS resource sets configured by the network device for the terminal device and may send SRS resources included in a first SRS resource set. A quantity of SRS resources included in the first SRS resource set may be equal to a quantity of antenna panels that can be used for receiving in the plurality of antenna panels of the terminal device, and the first SRS resource set is an SRS resource set in the one or more SRS resource sets. That can be used for receiving may be understood as can be used for receiving data and/or a signal.

For example, the terminal device includes three antenna panels, the network device configures an SRS resource set 1, an SRS resource set 2, and an SRS resource set 3 for the terminal device, the SRS resource set 1 includes one SRS resource, the SRS resource set 2 includes two SRS resources, and the SRS resource set 3 includes three SRS resources. If there are two antenna panels that can be used for receiving in the plurality of antenna panels of the terminal device, the first SRS resource set is the SRS resource set 2. Alternatively, if there are three antenna panels that can be used for receiving in the plurality of antenna panels of the terminal device, the first SRS resource set is the SRS resource set 3.

In another possible implementation, the network device may configure one or more SRS resource sets for the terminal device. A quantity of SRS resources included in each of the one or more SRS resource sets is equal to a quantity of antenna panels that can be used for receiving in the plurality of antenna panels of the terminal device.

Optionally, in the plurality of SRS resource sets, types of SRS resources included in different SRS resource sets may be different. Each SRS resource included in each SRS resource set may be associated with one antenna panel of the terminal device, and different SRS resources are associated with different antenna panels.

Optionally, the terminal device may determine one or more SRS resource sets configured by the network device for the terminal device, and send N SRS resources in the first SRS resource set, where N is a quantity of antenna panels that can be used for receiving in the plurality of antenna panels of the terminal device.

Optionally, the first SRS resource set may be one of the one or more SRS resource sets. In this case, that the terminal device sends N SRS resources in the first SRS resource set may include: The terminal device sends first N or last N SRS resources in the first SRS resource set; or the terminal device sends N SRS resources with smallest or largest identifiers in the first SRS resources; or the terminal device sends N SRS resources that are in the first SRS resource set and that are respectively associated with the N antenna panels that can be used for receiving.

Alternatively, optionally, the first SRS resource sets may be a plurality of SRS resource sets in the one or more SRS resource sets. In this case, the N SRS resources in the first SRS resource set sent by the terminal device may belong to different SRS resource sets. For example, if the first SRS resource sets include an SRS resource set 1 and an SRS resource set 2, and N is equal to 2, the N SRS resources may be one SRS resource in the SRS resource set 1 and one SRS resource in the SRS resource set 2.

Based on the foregoing two implementations, the network device may determine, based on current states of the plurality of antenna panels of the terminal device, SRS resources sent by the terminal device, and receive the SRS resources at corresponding locations, to perform uplink and downlink channel assessment.

It should be noted that the foregoing solution related to SRS transmission may be performed in combination with the solution shown in FIG. 4 or FIG. 8 in the embodiments. of the solution related to signal measurement may alternatively be separately performed.

Processing after the antenna panel is switched to the deactivated state is as follows.

When the first antenna panel is in the deactivated state, one or more of the following items corresponding to the first antenna panel are released: a reporting configuration, a resource configuration, a resource set, a resource, a HARQ process, QCL information, TCI-state information, a timer, a PUCCH, a PUSCH, a control-resource set (CORESET), a CORESET group, a PDCCH, a physical random access (PRACH) resource, a timing advance group (TAG) configuration, a beam failure detection resource, an alternative beam resource, a beam failure recovery resource, an alternative beam identification resource, a cell, or a bandwidth part (BWP).

Optional"y, "rel"ase" may also be understood "as "deactiva"io" ", "dele"ion"," or "rem"val", and can be replaced with each other. This is not limited in the embodiments.

Based on this solution, when the antenna panel is in the deactivated state, a resource corresponding to the antenna panel may be released, and the like, to avoid a problem that the antenna panel continues to occupy a resource and the resource cannot be fully used, thereby improving resource utilization.

It should be noted that the foregoing processing solution after the antenna panel is switched to the deactivated state may be performed in combination with the solution shown in FIG. 4 or FIG. 8 in the embodiments. The solution related to signal measurement may alternatively be separately performed.

In another implementation scenario of this embodiment, the terminal device may further send terminal capability parameter information to the network device, where the terminal capability parameter information includes one or more of the following:

a multi-panel transmission manner supported by the terminal device, where the multi-panel transmission manner includes: turning on a single antenna panel for transmission, turning on a plurality of antenna panels but using a single panel for transmission at a time, or simultaneously using a plurality of antenna panels for transmission, where turning on a single antenna panel for transmission may indicate that only a single antenna panel can be turned on at a time for transmission; turning on a plurality of antenna panels but using a single panel for transmission at a time may indicate that a plurality of antenna panels can be turned on at a time, but only a single antenna panel can be used for transmission; and simultaneously using a plurality of antenna panels for transmission may indicate that a plurality of antenna panels can be turned on at a time, and the plurality of antenna panels can be used for transmission;

a multi-panel sending manner supported by the terminal device, where the multi-panel sending manner includes: turning on a single antenna panel for sending, turning on a plurality of antenna panels but using a single panel for sending at a time, or simultaneously using a plurality of antenna panels for sending, where for details, refer to related descriptions in the multi-panel transmission manner, and details are not described herein again;

a multi-panel receiving manner supported by the terminal device, where the multi-panel receiving manner includes: turning on a single antenna panel for receiving, turning on a plurality of antenna panels but using a single panel for receiving at a time, or simultaneously using a plurality of antenna panels for receiving, where for details, refer to related descriptions in the multi-panel transmission manner, and details are not described herein again;

a quantity of antenna panels that can be in the activated state simultaneously, where for example, the terminal device includes three antenna panels, and the quantity of antenna panels that can be simultaneously in the activated state may be 3, that is, the three antenna panels may be in the activated state simultaneously;

a quantity of antenna panels that can be in the semi-activated state simultaneously, where for example, the terminal device includes three antenna panels, and the quantity of antenna panels that can be simultaneously in the semi-activated state may be 2, that is, the three antenna panels cannot be in the semi-activated state simultaneously;

a quantity of states supported by an antenna panel, for example, a value of K;

duration of a timer for state switching of an antenna panel, for example, the duration of the first timer and/or the second timer;

a periodicity for state switching of an antenna panel, for example, the foregoing switching periodicity;

a quantity of antenna panels used for downlink transmission, that is, a quantity of antenna panels of the terminal device that are used for downlink transmission; or a quantity of antenna panels that can be used for simultaneous downlink transmission; or a quantity of antenna panels that can be activated and that are used for downlink transmission;

a quantity of antenna panels used for uplink transmission, that is, a quantity of antenna panels of the terminal device that are used for uplink transmission; or a quantity of antenna panels that can be used for simultaneous uplink transmission; or a quantity of antenna panels that can be activated and that are used for uplink transmission;

an antenna panel turning-on periodicity, that is, a time interval for turning on the antenna panel, for example, a time interval for switching from the deactivated state to the semi-activated state/activated state, where the network device may set a periodicity of the measurement configuration (resource configuration or reporting configuration) based on the periodicity reported by the terminal device, to perform corresponding measurement; or an effective time of state switching of an antenna panel, that is, a time interval for state switching of the antenna panel after the terminal device receives an antenna panel switching instruction (for example, the first indication information) or sends antenna panel switching indication information (for example, the second indication information) to the network device.

Optionally, in the method provided in the foregoing embodiment, a granularity may be a cell, a component carrier (CC), a transmission and reception point (TRP), a CORESET, or a CORESET group. For different cells, CCs, TRPs, CORESETs, or CORESET groups, the terminal device may separately manage antenna panels.

Optionally, for different cells, CCs, TRPs, CORESETs, or CORESET groups, states or operations that can be performed on a same antenna panel may be different. For example, for some cells, CCs, TRPs, CORESETs, or CORESET groups, the state of the antenna panel 1 is state #1, and for other cells, CCs, TRPs, CORESETs, or CORESET groups, the state of the antenna panel 1 is state #2. For another example, for some cells, CCs, TRPs, CORESETs, or CORESET groups, the antenna panel 1 may be used for transmission, and for other cells, CCs, TRPs, CORESETs, or CORESET groups, the antenna panel 1 cannot be used for transmission.

In the foregoing embodiment, the processor 301 in the network device 30 shown in FIG. 2 may call the application program code stored in the memory 302 to indicate the network device to execute the actions of the network device. In the foregoing embodiment, the processor 401 in the terminal device 40 shown in FIG. 2 may call the application program code stored in the memory 402 to indicate the terminal device to execute the actions of the terminal device. This is not limited in this embodiment.

In the embodiments, unless otherwise stated or there is a logic conflict, terms and/or descriptions between different embodiments are consistent and may be mutually referenced, and the different embodiments may be combined based on an internal logical relationship thereof to form a new embodiment.

It may be understood that, in the foregoing embodiments, methods and/or steps implemented by the terminal device may also be implemented by a component (for example, a chip or a circuit) that can be used in the terminal device, and methods and/or steps implemented by the network device may also be implemented by a component that can be used in the network device.

The foregoing describes the embodiments from the perspective of interaction between network elements. Correspondingly, the embodiments may further provide a communication apparatus, and the communication apparatus is configured to implement the foregoing various methods. The communication apparatus may be the terminal device in the foregoing method embodiments, an apparatus including the foregoing terminal device, or a component that can be used in the terminal device. Alternatively, the communication apparatus may be the network device in the foregoing method embodiments, an apparatus including the foregoing network device, or a component that can be used in the network device. It may be understood that, to implement the foregoing functions, the communication apparatus includes a corresponding hardware structure and/or software module for performing the functions. A person skilled in the art should be easily aware that units, algorithms, and steps in the examples described with reference to the embodiments can be implemented in a form of hardware or a combination of hardware and computer software. Whether a function is performed by hardware or hardware driven by computer software depends on a particular application. A person skilled in the art may use different methods to implement the described functions for each particular application, but it should not be considered that the implementation goes beyond the scope of the embodiments.

In the embodiments, the communication apparatus may be divided into functional modules based on the foregoing method embodiment. For example, each functional module may be obtained through division based on each corresponding function, or two or more functions may be integrated into one processing module. The integrated module may be implemented in a form of hardware or may be implemented in a form of a software functional module. It should be noted that, in the embodiments, division into the modules is an example and is merely logical function division, and may be other division in an actual implementation.

Figure 9:
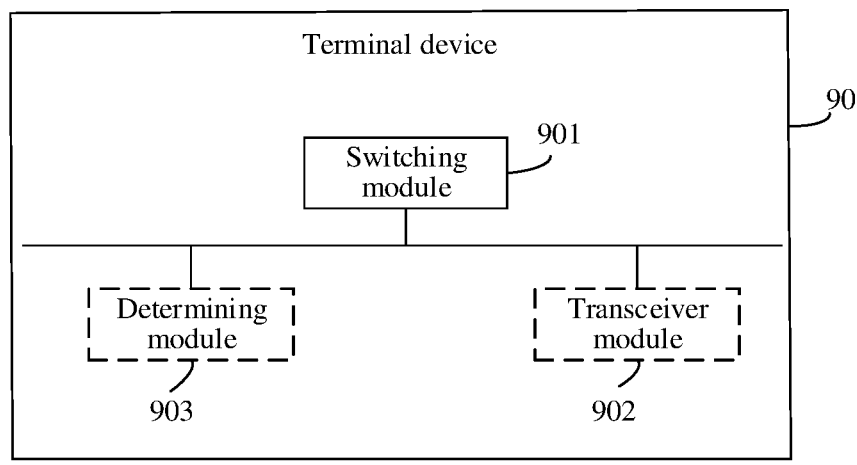
FIG. 9 is a schematic diagram of a structure of another terminal device according to an embodiment.

For example, the communication apparatus is the terminal device in the foregoing method embodiments. FIG. 9 is a schematic diagram of a structure of a terminal device 90. The terminal device 90 includes a switching module 901.

Optionally, the terminal device 90 may further include a transceiver module 902 and a determining module 903. The switching module 901 and the determining module 903 may be collectively referred to as a processing module and may be independently deployed or integrated together. The transceiver module 902 may also be referred to as a transceiver unit, and is configured to implement a sending and/or receiving function, which, for example, may be a transceiver circuit, a transceiver, or a communication interface.

The transceiver module 902 may include a receiving module and a sending module, which are respectively configured to perform the receiving and sending steps performed by the terminal device in the foregoing method embodiments, and the switching module 901 and the determining module 903 may be configured to perform other steps performed by the terminal device in the foregoing method embodiments except for the receiving and sending steps.

In a possible implementation, the switching module 901 is configured to switch a state of a first antenna panel from a first state to a second state. The terminal device 90 includes a plurality of antenna panels. The plurality of antenna panels support one or more of an activated state, a semi-activated state, or a deactivated state, and the first antenna panel is one or more of the plurality of antenna panels. An antenna panel in the activated state can be used for signal measurement, and can be used for data transmission; an antenna panel in the semi-activated state can be used for signal measurement, but cannot be used for data transmission; and an antenna panel in the deactivated state cannot be used for signal measurement, and cannot be used for data transmission.

Optionally, that the switching module 901 is configured to switch a state of a first antenna panel from a first state to a second state may include: The switching module 901 is configured to switch the state of the first antenna panel from the first state to the second state when the determining module 903 determines that a first condition is met. That is, the determining module 903 is configured to determine that the first condition is met.

Optionally, the transceiver module 902 is configured to send third indication information to a network device, where the third indication information indicates that the state of the first antenna panel is switched according to a switching rule, and the switching rule includes one or more of the following: the deactivated state can be switched to the semi-activated state; the semi-activated state can be switched to the activated state; the activated state can be switched to the deactivated state; the semi-activated state can be switched to the deactivated state; or the deactivated state can be switched to the activated state.

Optionally, the transceiver module 902 is further configured to send second information to the network device, where the second information includes one or more of the following: an identifier of the first antenna panel, a quantity of antenna panels in the activated state in the plurality of antenna panels of the terminal device, a quantity of antenna panels in the semi-activated state in the plurality of antenna panels of the terminal device, reporting configuration information, resource configuration information, resource set information, resource information, a resource type, a reporting amount, a reporting time domain type, a reporting frequency domain granularity, a group reporting indication, a repetition parameter indication, quasi co-location QCL information, transmission configuration index state TCI-state information, indication information, or time information. The indication information indicates that a newly added antenna panel enters the activated state or the semi-activated state, and the time information indicates maximum duration for which the first antenna panel is in the activated state or the semi-activated state.

Optionally, the switching module 901 is further configured to determine one or more SRS resource sets configured by the network device. The transceiver module 902 is further configured to send SRS resources included in a first SRS resource set, where a quantity of SRS resources included in the first SRS resource set is equal to a quantity of antenna panels that can be used for receiving in the plurality of antenna panels of the terminal device, and the first SRS resource set is one SRS resource set of one or more SRS resource sets.

Optionally, the switching module 901 is further configured to determine one or more SRS resource sets configured by the network device. A quantity of SRS resources included in the SRS resource set is equal to a quantity of antenna panels of the terminal device. The transceiver module 902 is further configured to send N SRS resources in the one or more SRS resource sets, where N is a quantity of antenna panels that can be used for receiving in the plurality of antenna panels of the terminal device.

Optionally, the switching module 901 is further configured to release one or more of the following parameters corresponding to the first antenna panel: a reporting configuration, a resource configuration, a resource set, a resource, a hybrid automatic repeat request HARQ process, QCL information, TCI-state information, a timer, a physical uplink control channel PUCCH, a physical uplink shared channel PUSCH, a control resource set CORESET, a CORESET group, a physical downlink control channel PDCCH, a physical random access channel PRACH resource, a timing advance group TAG configuration, a beam failure detection resource, an alternative beam resource, a beam failure recovery resource, an alternative beam identification resource, a cell, or a bandwidth part BWP.

Optionally, the transceiver module 902 is further configured to send terminal capability parameter information to the network device, where the terminal capability parameter information includes one or more of the following: a multi-panel transmission manner supported by the terminal device, where the multi-panel transmission manner includes: turning on a single antenna panel for transmission, turning on a plurality of antenna panels but using a single panel for transmission at a time, or simultaneously using a plurality of antenna panels for transmission; a multi-panel sending manner supported by the terminal device, where the multi-panel sending manner includes: turning on a single antenna panel for sending, turning on a plurality of antenna panels but using a single panel for sending at a time, or simultaneously using a plurality of antenna panels for sending; a multi-panel receiving manner supported by the terminal device, where the multi-panel receiving manner includes: turning on a single antenna panel for receiving, turning on a plurality of antenna panels but using a single panel for receiving at a time, or simultaneously using a plurality of antenna panels for receiving; a quantity of antenna panels that can be in the activated state simultaneously; a quantity of antenna panels that can be in the semi-activated state simultaneously; a quantity of states supported by an antenna panel; duration of a timer for state switching of an antenna panel; or a periodicity for state switching of an antenna panel.

In another possible implementation, the transceiver module 902 is configured to receive a first message from the network device. The first message indicates states of one or more antenna panels. The state may be a current state of an antenna panel determined by the network device, or may be a state that is indicated by the network device and to which the antenna panel is to be switched, that is, the network device instructs the terminal device to switch the state of the antenna panel to the state indicated by the first message. When a current state of an antenna panel is different from the state that is of the panel and that is indicated by the first message, the switching module 901 is configured to switch the state of the antenna panel to the state that is of the panel and that is indicated by the first message.

All related content of the steps in the method embodiments may be cited in function descriptions of corresponding functional modules. Details are not described herein again.

In this embodiment, the terminal device 90 is presented in a form of functional modules obtained through division in an integrated manner. The "module" herein may be an ASIC, a circuit, a processor, and a memory that execute one or more software or firmware programs, an integrated logic circuit, and/or another component that can provide the foregoing functions. In a simple embodiment, a person skilled in the art may figure out that the terminal device 90 may be in a form of the terminal device 40 shown in FIG. 2.

For example, the processor 401 in the terminal device 40 shown in FIG. 2 may call the computer-executable instructions stored in the memory 402, so that the terminal device 40 performs the antenna panel management method in the foregoing method embodiments.

A function/implementation process of the switching module 901, the transceiver module 902, and the determining module 903 in FIG. 9 may be implemented by the processor 401 in the terminal device 40 shown in FIG. 2 by calling the computer-executable instructions stored in the memory 402. Alternatively, a function/implementation process of the switching module 901 and the determining module 903 in FIG. 9 may be implemented by the processor 401 in the terminal device 40 shown in FIG. 2 by calling the computer-executable instructions stored in the memory 402, and a function/implementation process of the transceiver module 902 in FIG. 9 may be implemented by the transceiver 403 in the terminal device 40 shown in FIG. 2.

Because the terminal device 90 provided in this embodiment can perform the foregoing antenna panel management method, refer to the foregoing method embodiments. Details are not described herein again.

Figure 10:
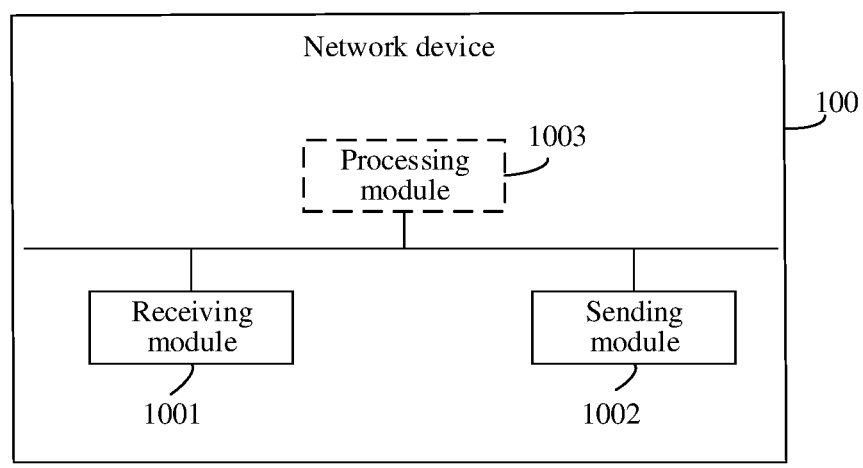
FIG. 10 is a schematic diagram of a structure of another network device according to an embodiment.

Alternatively, for example, an example in which the communication apparatus is the network device in the foregoing method embodiments is used. FIG. 10 is a schematic diagram of a structure of a network device 100. The network device 100 includes a receiving module 1001 and a sending module 1002. Optionally, the network device 100 may further include a processing module 1003. The receiving module 1001 and the sending module 1002 may be collectively referred to as a transceiver module. The transceiver module may also be referred to as a transceiver unit, and is configured to implement a sending and/or receiving function, which, for example, may be a transceiver circuit, a transceiver, or a communication interface.

The receiving module 1001 and the sending module 1002 are respectively configured to perform the receiving and sending steps performed by the network device in the foregoing method embodiments, and the processing module 1003 may be configured to perform other steps performed by the network device in the foregoing method embodiments except for the receiving and sending steps.

In a possible implementation, the sending module 1002 is configured to send first indication information to a terminal device, where the first indication information indicates switching of a state of a first antenna panel of the terminal device, or in other words, the first indication information indicates switching of the state of the first antenna panel according to a switching rule.

Optionally, the receiving module 1001 is configured to receive first ACK information from the terminal device, where the first ACK information indicates that the terminal device receives the first indication information, and/or that the terminal device is to switch the state of the first antenna panel based on an indication of the first indication information.

In another possible implementation, the receiving module 1001 is configured to receive second indication information from the terminal device, where the second indication information indicates that the terminal device switches the state of the first antenna panel, or in other words, the second indication information indicates that the terminal device is to switch the state of the first antenna panel according to a switching rule. The processing module 1003 is configured to determine, based on the second indication information, that the state of the first antenna panel is switched to a second state.

Optionally, the sending module 1002 is configured to send second ACK information to the terminal device, where the second ACK information is ACK information of the second indication information. The second ACK information indicates that the network device receives the second indication information, and/or indicates that the network device allows the terminal device to switch the state of the first antenna panel.

In the foregoing two possible implementations, optionally, the receiving module 1001 is further configured to receive second information from the terminal device.

In the foregoing two possible implementations, optionally, the processing module 1003 is further configured to configure one or more SRS resource sets for the terminal device, where a quantity of SRS resource sets is equal to a quantity of antenna panels of the terminal device, and different SRS resource sets include different quantities of SRS resources.

In the foregoing two possible implementations, optionally, the processing module 1003 is further configured to configure one or more SRS resource sets for the terminal device, where a quantity of SRS resources included in each of the one or more SRS resource sets is equal to a quantity of antenna panels of the terminal device.

In still another possible implementation, the processing module 1003 is configured to generate a first message, and the sending module 1002 is configured to send the first message to the terminal device. The first message indicates states of one or more antenna panels. The state may be a current state of an antenna panel determined by the network device, or may be a state that is indicated by the network device and to which the antenna panel is to be switched, that is, the network device instructs the terminal device to switch the state of the antenna panel to the state indicated by the first message.

All related content of the steps in the method embodiments may be cited in function descriptions of corresponding functional modules. Details are not described herein again.

In this embodiment, the network device 100 is presented in a form of functional modules obtained through division in an integrated manner. The "module" herein may be an ASIC, a circuit, a processor and a memory that execute one or more software or firmware programs, an integrated logic circuit, and/or another component that can provide the foregoing functions. In a simple embodiment, a person skilled in the art may figure out that the network device 100 may be in a form of the network device 30 shown in FIG. 2.

For example, the processor 301 in the network device 30 shown in FIG. 2 may call the computer-executable instructions stored in the memory 302, so that the network device 30 performs the antenna panel management method in the foregoing method embodiments.

A function/implementation process of the receiving module 1001, the sending module 1002, and the processing module 1003 in FIG. 10 may be implemented by the processor 301 in the network device 30 shown in FIG. 2 by calling the computer-executable instructions stored in the memory 302. Alternatively, a function/implementation process of the processing module 1003 in FIG. 10 may be implemented by the processor 301 in the network device 30 shown in FIG. 2 by calling the computer-executable instructions stored in the memory 302, and a function/implementation process of the receiving module 1001 and the sending module 1002 in FIG. 10 may be implemented by the transceiver 303 in the network device 30 shown in FIG. 2.

Because the network device 100 provided in this embodiment can perform the foregoing antenna panel management method, refer to the foregoing method embodiments. Details are not described herein again.

Optionally, an embodiment may further provide a communication apparatus (for example, the communication apparatus may be a chip or a chip system). The communication apparatus includes a processor, configured to implement the method in any one of the foregoing method embodiments. The communication apparatus may further include a memory. The memory is configured to store necessary program instructions and necessary data. The processor may call program code stored in the memory, to indicate the communication apparatus to perform the method in any one of the foregoing method embodiments. The communication apparatus may not include a memory. The communication apparatus may further include an interface circuit. The interface circuit is a code/data read/write interface circuit, and the interface circuit is configured to receive computer-executable instructions (where the computer-executable instructions are stored in a memory, and may be directly read from the memory, or may be read via another component) and transmit the computer-executable instructions to the processor. When the communication apparatus is a chip system, the communication apparatus may include a chip, or may include a chip and another discrete component. This is not limited in the embodiments.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to the embodiments are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like. In the embodiments, the computer may include the apparatus described above.

A person skilled in the art may understand and implement another variation of the embodiments by viewing the appended drawings and described embodiments. A single processor or another unit may implement several functions enumerated in the embodiments. Some measures are set forth in dependent embodiments that are different from each other, but this does not mean that these measures cannot be combined to produce a great effect.

Although described with reference to features and all the embodiments thereof, it is clear that various modifications and combinations may be made to them without departing from the scope of the embodiments. Correspondingly, this embodiments and the accompanying drawings are merely example descriptions, and any or all of modifications, variations, combinations or equivalents that fall within the scope of the embodiments. A person skilled in the art can make various modifications and variations provided that they fall within the scope of defined by the embodiments and their equivalent technologies.

What is claimed is:

1. An antenna panel management method, comprising:
    switching, by a terminal device, a state of a first antenna panel from a first state to a second state, wherein the terminal device comprises a plurality of antenna panels, the plurality of antenna panels support one or more of an activated state, a semi-activated state, or a deactivated state, and the first antenna panel is one or more of the plurality of antenna panels, wherein
    an antenna panel in the activated state can be used for signal measurement, and can be used for data transmission;
    an antenna panel in the semi-activated state can be used for signal measurement, but cannot be used for data transmission; and
    an antenna panel in the deactivated state cannot be used for signal measurement and data transmission
    switching, by the terminal device, the state of the first antenna panel from the first state to the second state when a first condition is met;
    the first state is the semi-activated state, and the second state is the deactivated state;
    the first condition is that a first timer expires, wherein the first time is a timer activated when the first antenna panel enters the first state.

2. The antenna panel management method according to claim 1, wherein the activated state, the semi-activated state, and the deactivated state meet a switching rule, and the switching rule comprises one or more of the following:
    the activated state can be switched to the deactivated state;

the deactivated state can be switched to the semi-activated state;
the semi-activated state can be switched to the activated state;
the semi-activated state can be switched to the deactivated state; or
the deactivated state can be switched to the activated state.

3. The antenna panel management method according to claim 2, further comprising:
sending, by the terminal device, third indication information to a network device, wherein the third indication information indicates that the state of the first antenna panel is switched according to the switching rule.

4. The antenna panel management method according to claim 1, wherein the first condition comprises one or more of the following:
first indication information from a network device is received;
first indication information from a network device is received, and first duration has elapsed since receiving of the first indication information;
first acknowledgment (ACK) information is sent to a network device after first indication information from the network device is received, and second duration has elapsed since sending of the first ACK information, wherein the first ACK information is ACK information of the first indication information;
first indication information from a network device is received, wherein the first indication information indicates first switching time, and the first switching time arrives;
second indication information is sent to a network device;
second indication information is sent to a network device, and second ACK information from the network device is received;
second indication information is sent to a network device, and third duration has elapsed since sending of the second indication information;
second ACK information from a network device is received after second indication information is sent to the network device, and fourth duration has elapsed since receiving of the second ACK information;
second indication information is sent to a network device, wherein the second indication information indicates second switching time, and the second switching time arrives; or
a second timer expires, wherein the second timer is a timer activated when the first antenna panel enters the first state, wherein
the first indication information indicates switching of the state of the first antenna panel, the second indication information indicates that the state of the first antenna panel is to be switched, and the second ACK information is ACK information of the second indication information.

5. The antenna panel management method according to claim 4, wherein the first state is the deactivated state, and the second state is the semi-activated state; or
the first state is the semi-activated state, and the second state is the activated state; or
the first state is the activated state, and the second state is the deactivated state; or
the first state is the deactivated state, and the second state is the activated state.

6. The antenna panel management method according to claim 1, wherein when the second state is the semi-activated state or the activated state, the method further comprises:
sending, by the terminal device, one or more of the following to a network device: an identifier of the first antenna panel, a quantity of antenna panels in the activated state in the plurality of antenna panels of the terminal device, a quantity of antenna panels in the semi-activated state in the plurality of antenna panels of the terminal device, reporting configuration information, resource configuration information, resource set information, resource information, a resource type, a reporting amount, a reporting time domain type, a reporting frequency domain granularity, a group reporting indication, a repetition parameter indication, quasi co-location (QCL) information, transmission configuration index state (TCI-state) information, indication information, or time information, wherein the indication information indicates that a newly added antenna panel enters the activated state or the semi-activated state, and the time information indicates maximum duration for which the first antenna panel is in the activated state or the semi-activated state.

7. The antenna panel management method according to claim 1, wherein the first antenna panel is associated with a first configuration, the first configuration is used for signal measurement corresponding to the first antenna panel, and the first configuration is activated when the state of the first antenna panel is switched to the activated state or the semi-activated state; or the first configuration is deactivated when the state of the first antenna panel is switched to the deactivated state; and
the first configuration comprises one or more of the following: a reporting configuration, a resource configuration, a resource set, or a resource.

8. The antenna panel management method according to claim 1, further comprising:
sending, by the terminal device, sounding reference signal (SRS) resources comprised in a first SRS resource set, wherein a quantity of SRS resources comprised in the first SRS resource set is equal to a quantity of antenna panels that can be used for receiving in the plurality of antenna panels of the terminal device.

9. The antenna panel management method according to claim 1, further comprising:
sending, by the terminal device, N SRS resources in one or more SRS resource sets, wherein N is a quantity of antenna panels that can be used for receiving in the plurality of antenna panels of the terminal device, and a quantity of SRS resources comprised in each of the one or more SRS resource sets is equal to a quantity of antenna panels of the terminal device.

10. The antenna panel management method according to claim 1, wherein when the first antenna panel is in the deactivated state, the method further comprises:
releasing one or more of the following parameters corresponding to the first antenna panel: a reporting configuration, a resource configuration, a resource set, a resource, a hybrid automatic repeat request (HARQ) process, quasi co-location (QCL) information, TCI-state information, a timer, a physical uplink control channel (PUCCH), a physical uplink shared channel (PUSCH), a control resource set (CORESET), a CORESET group, a physical downlink control channel (PDCCH), a physical random access channel (PRACH) resource, a timing advance group (TAG) configuration, a beam failure detection resource, an alternative beam resource, a beam failure recovery resource, an alternative beam identification resource, a cell, or a bandwidth part (BWP).

11. The antenna panel management method according to claim 1, further comprising:
sending, by the terminal device, terminal capability parameter information to a network device, wherein the terminal capability parameter information comprises one or more of the following:
a multi-panel transmission manner supported by the terminal device, wherein the multi-panel transmission manner comprises: turning on a single antenna panel for transmission, turning on a plurality of antenna panels but using a single panel for transmission at a time, or simultaneously using a plurality of antenna panels for transmission;
a multi-panel sending manner supported by the terminal device, wherein the multi-panel sending manner comprises: turning on a single antenna panel for sending, turning on a plurality of antenna panels but using a single panel for sending at a time, or simultaneously using a plurality of antenna panels for sending;
a multi-panel receiving manner supported by the terminal device, wherein the multi-panel receiving manner comprises: turning on a single antenna panel for receiving, turning on a plurality of antenna panels but using a single panel for receiving at a time, or simultaneously using a plurality of antenna panels for receiving;
a quantity of antenna panels that can be in the activated state simultaneously;
a quantity of antenna panels that can be in the semi-activated state simultaneously;
a quantity of states supported by an antenna panel;
duration of a timer for state switching of an antenna panel; or
a periodicity for state switching of an antenna panel.

12. A communication apparatus, wherein the communication apparatus comprises a processor; and
the processor is configured to switch a state of a first antenna panel from a first state to a second state, the communication apparatus comprises a plurality of antenna panels, the plurality of antenna panels support one or more of an activated state, a semi-activated state, or a deactivated state, and the first antenna panel is one or more of the plurality of antenna panels, wherein
an antenna panel in the activated state can be used for signal measurement, and can be used for data transmission;
an antenna panel in the semi-activated state can be used for signal measurement, but cannot be used for data transmission; and
an antenna panel in the deactivated state cannot be used for signal measurement and data transmission
the processor is configured to switch the state of the first antenna panel from the first state to the second state when the processor determines that a first condition is met;
the first state is the semi-activated state, and the second state is the deactivated state;
the first condition is that a first timer expires, wherein the first time is a timer activated when the first antenna panel enters the first state.

13. The communication apparatus according to claim 12, wherein the communication apparatus further comprises a transceiver; and
the transceiver is configured to send third indication information to a network device, wherein the third indication information indicates that the state of the first antenna panel is switched according to a switching rule, and the switching rule comprises one or more of the following:
the deactivated state can be switched to the semi-activated state;
the semi-activated state can be switched to the activated state;
the activated state can be switched to the deactivated state;
the semi-activated state can be switched to the deactivated state; or
the deactivated state can be switched to the activated state.

14. The communication apparatus according to claim 12, wherein the communication apparatus further comprises a transceiver; and
when the second state is the semi-activated state or the activated state, the transceiver is configured to send second information to a network device, wherein the second information comprises one or more of the following: an identifier of the first antenna panel, a quantity of antenna panels in the activated state in the plurality of antenna panels of the communication apparatus, a quantity of antenna panels in the semi-activated state in the plurality of antenna panels of the communication apparatus, reporting configuration information, resource configuration information, resource set information, resource information, a resource type, a reporting amount, a reporting time domain type, a reporting frequency domain granularity, a group reporting indication, a repetition parameter indication, quasi co-location QCL information, transmission configuration index state TCI-state information, indication information, or time information, wherein
the indication information indicates that a newly added antenna panel enters the activated state or the semi-activated state, and the time information indicates maximum duration for which the first antenna panel is in the activated state or the semi-activated state.

15. The communication apparatus according to claim 12, wherein the communication apparatus further comprises
a transceiver; and the transceiver is configured to send SRS resources comprised in a first SRS resource set, wherein a quantity of SRS resources comprised in the first SRS resource set is equal to a quantity of antenna panels that can be used for receiving in the plurality of antenna panels of the communication apparatus.

16. The communication apparatus according to claim 12, wherein the communication apparatus further comprises
a transceiver; and the transceiver is configured to send N SRS resources in one or more SRS resource sets, wherein N is a quantity of antenna panels that can be used for receiving in the plurality of antenna panels of the communication apparatus, and a quantity of SRS resources comprised in each of the one or more SRS resource sets is equal to a quantity of antenna panels of the communication apparatus.

17. The communication apparatus according to claim 12, wherein the communication apparatus further comprises a transceiver; and
the transceiver is configured to send terminal capability parameter information to a network device, wherein the terminal capability parameter information comprises one or more of the following:
a multi-panel transmission manner supported by the communication apparatus, wherein the multi-panel transmission manner comprises: turning on a single antenna panel for transmission, turning on a plurality of antenna panels but using a single panel for transmission at a time, or simultaneously using a plurality of antenna panels for transmission;

a multi-panel sending manner supported by the communication apparatus, wherein the multi-panel sending manner comprises:

turning on a single antenna panel for sending, turning on a plurality of antenna panels but using a single panel for sending at a time, or simultaneously using a plurality of antenna panels for sending;

a multi-panel receiving manner supported by the communication apparatus, wherein the multi-panel receiving manner comprises:

turning on a single antenna panel for receiving, turning on a plurality of antenna panels but using a single panel for receiving at a time, or simultaneously using a plurality of antenna panels for receiving;

a quantity of antenna panels that can be in the activated state simultaneously;

a quantity of antenna panels that can be in the semi-activated state simultaneously;

a quantity of states supported by an antenna panel;

duration of a timer for state switching of an antenna panel; or a periodicity for state switching of an antenna panel.

18. The communication apparatus according to claim 12, further comprising:

a transceiver configured to send third indication information to a network device, wherein the third indication information indicates that the state of the first antenna panel is switched according to the switching rule.

19. The communication apparatus according to claim 12, further comprising:

a transceiver configured to sending terminal capability parameter information to a network device, wherein the terminal capability parameter information comprises one or more of the following:

a multi-panel transmission manner supported by the terminal device, wherein the multi-panel transmission manner comprises: turning on a single antenna panel for transmission, turning on a plurality of antenna panels but using a single panel for transmission at a time, or simultaneously using a plurality of antenna panels for transmission;

a multi-panel sending manner supported by the terminal device, wherein the multi-panel sending manner comprises: turning on a single antenna panel for sending, turning on a plurality of antenna panels but using a single panel for sending at a time, or simultaneously using a plurality of antenna panels for sending;

a multi-panel receiving manner supported by the terminal device, wherein the multi-panel receiving manner comprises: turning on a single antenna panel for receiving, turning on a plurality of antenna panels but using a single panel for receiving at a time, or simultaneously using a plurality of antenna panels for receiving;

a quantity of antenna panels that can be in the activated state simultaneously;

a quantity of antenna panels that can be in the semi-activated state simultaneously;

a quantity of states supported by an antenna panel;

duration of a timer for state switching of an antenna panel; or a periodicity for state switching of an antenna panel.

20. A non-transitory computer-readable medium comprising instructions executed by a processor, wherein the processor is configured to switch a state of a first antenna panel from a first state to a second state, the communication apparatus comprises a plurality of antenna panels, the plurality of antenna panels support one or more of an activated state, a semi-activated state or a deactivated state, and the first antenna panel is one or more of the plurality of antenna panels, wherein an antenna panel in the activated state can be used for signal measurement, and can be used for data transmission;

an antenna panel in the semi-activated state can be used for signal measurement, but cannot be used for data transmission; and an antenna panel in the deactivated state cannot be used for signal measurement and data transmission, the processor is configured to switch the state of the first antenna panel from the first state to the second state when the processor determines that a first condition is met, the first state is the semi-activated state, and the second state is the deactivated state, and the first condition is that a first timer expires, wherein the first timer is a timer activated when the first antenna panel enters the first state.

* * * * *